(12) United States Patent
Tsuchizawa

(10) Patent No.: US 11,001,337 B2
(45) Date of Patent: May 11, 2021

(54) HUMAN-POWERED VEHICLE CONTROL DEVICE

(71) Applicant: Shimano Inc., Osaka (JP)

(72) Inventor: Yasuhiro Tsuchizawa, Osaka (JP)

(73) Assignee: Shimano Inc., Osaka (JP)

( * ) Notice: Subject to any disclaimer, the term of this patent is extended or adjusted under 35 U.S.C. 154(b) by 422 days.

(21) Appl. No.: 16/210,329

(22) Filed: Dec. 5, 2018

(65) Prior Publication Data

US 2019/0193810 A1 Jun. 27, 2019

(30) Foreign Application Priority Data

Dec. 27, 2017 (JP) .............................. JP2017-252369

(51) Int. Cl.
   *B62M 6/45* (2010.01)
   *B62M 6/55* (2010.01)
   *B62M 6/65* (2010.01)

(52) U.S. Cl.
   CPC ................ *B62M 6/45* (2013.01); *B62M 6/65* (2013.01)

(58) Field of Classification Search
   CPC . B62M 6/40; B62M 6/45; B62M 6/50; B62M 6/55; B62M 6/60; B62M 6/65
   See application file for complete search history.

(56) References Cited

U.S. PATENT DOCUMENTS

| 5,922,035 | A  | * | 7/1999  | Chen ........................ B62M 6/60 701/22 |
| 10,507,886 | B2 | * | 12/2019 | Shahana ................... B62M 6/55 |
| 10,953,953 | B2 | * | 3/2021  | Shahana ................... B62M 6/45 |
| 2015/0120117 | A1 | * | 4/2015  | Tsuchizawa .............. B62M 6/50 701/22 |
| 2016/0159432 | A1 | * | 6/2016  | Nishikawa ............... B62M 6/50 701/22 |
| 2016/0159433 | A1 | * | 6/2016  | Nishikawa ............. B62M 25/04 701/22 |
| 2017/0247080 | A1 | * | 8/2017  | Tsuchizawa ............. B60L 15/20 |
| 2018/0257740 | A1 | * | 9/2018  | Kikkawa ............... B62B 5/0073 |

FOREIGN PATENT DOCUMENTS

JP         2008-228546 A        9/2008

* cited by examiner

*Primary Examiner* — Anne Marie M Boehler
(74) *Attorney, Agent, or Firm* — Global IP Counselors, LLP

(57) ABSTRACT

A human-powered vehicle control device includes an electronic controller that controls a motor used to assist in propulsion of a human-powered vehicle. The electronic controller is selectively settable to a first control state that controls the motor in accordance with human drive force and a second control state that controls the motor in accordance with human drive force so that a ratio of an output of the motor to the human drive force is greater than that of the first control state. In the first control state, the electronic controller controls the motor so that a response speed of the motor with respect to a change in the human drive force is equal to a first response speed. In the second control state, the electronic controller controls the motor so that the response speed is equal to a second response speed that is slower than the first response speed.

19 Claims, 10 Drawing Sheets

HUMAN-POWERED VEHICLE CONTROL DEVICE

CROSS-REFERENCE TO RELATED APPLICATIONS

This application claims priority to Japanese Patent Application No.2017-252369, filed on Dec. 27, 2017. The entire disclosure of Japanese Patent Application No. 2017-252369 is hereby incorporated herein by reference.

BACKGROUND

Technical Field

The present disclosure generally relates to a human-powered vehicle control device for a human-powered vehicle.

Background Information

A human-powered vehicle control device for a human-powered vehicle disclosed in Japanese Laid-Open Patent Publication No. 2008-228546 (patent document 1) controls a motor that assists in propulsion of a human-powered vehicle in accordance with human drive force.

SUMMARY

It has been discovered that the preferred output of a motor differs in accordance with a traveling condition of the human-powered vehicle. The human-powered vehicle control device for the human-powered vehicle described above does not take this into consideration. One object of the present disclosure is to provide a human-powered vehicle control device for a human-powered vehicle capable of suitably controlling a motor according to a traveling condition.

A human-powered vehicle control device for a human-powered vehicle in accordance with a first aspect of the present disclosure comprises an electronic controller that controls a motor used to assist in propulsion of the human-powered vehicle. The electronic controller is configured to be selectively settable to a first control state that controls the motor in accordance with human drive force and a second control state that controls the motor in accordance with human drive force so that a ratio of an output of the motor to the human drive force is greater than that of the first control state. The electronic controller is configured to control the motor so that a response speed of the motor with respect to a change in the human drive force during a first predetermined period becomes equal to a first response speed while the electronic controller is set to the first control state. The electronic controller is configured to control the motor so that the response speed during a second predetermined period including the first predetermined period becomes equal to a second response speed that is slower than the first response speed while the electronic controller is set to the second control state.

In accordance with the first aspect, in the second control state where the ratio of the output of the motor to the human drive force is greater than that of the first control state, it is possible to make the response speed slower than the case of the first control state. Therefore, in the case where the output of the motor is increased in accordance with the human drive force in the second control state, the output of the motor can be increased smoothly. Therefore, the motor is suitably controlled in accordance with the traveling condition in both the first control state and the second control state.

In accordance with a second aspect of the present disclosure, in the human-powered vehicle control device for a human-powered vehicle according to the first aspect, the first predetermined period includes a period from a time at which the motor starts to be driven to a time at which a first period that is determined in advance elapses, and the second predetermined period includes a period from a time at which the motor starts to be driven to a time at which a second period that is determined in advance elapses.

In accordance with the second aspect, in the second control state, during the second predetermined period including the period from the time at which the motor starts to be driven to the time at which the second period elapses, the response speed can be slower than during the first predetermined period from the time at which the motor starts to be driven in the first state to the time at which the first period elapses. Therefore, in the second control state and during the second predetermined period including the period from the time at which the motor starts to be driven to the time at which the second period elapses, the output of the motor is smoothly increased in a case where the output of the motor is increased in accordance with the human drive force.

In accordance with a third aspect of the present disclosure, in the human-powered vehicle control device for a human-powered vehicle according to the first aspect, the first predetermined period includes a period from a time at which the motor starts to be driven to a time at which a traveling condition of the human-powered vehicle shifts to a first predetermined state, and the second predetermined period includes a period from a time at which the motor starts to be driven to a time at which the traveling condition of the human-powered vehicle shifts to a second predetermined state.

In accordance with the third aspect, in the second control state, during the second predetermined period including the period from the time at which the motor starts to be driven to the time at which the traveling condition of the human-powered vehicle shifts to the second predetermined state, the response speed can be slower than during the first predetermined period from the time at which the motor starts to be driven in the first state to the time at which the traveling condition of the human-powered vehicle shifts to the first predetermined state. Therefore, in the second control state and during the second predetermined period including the period from the time at which the motor starts to be driven to the time at which the traveling condition of the human-powered vehicle shifts to the second predetermined state, the output of the motor is smoothly increased in a case where the output of the motor is increased in accordance with the human drive force.

In accordance with a fourth aspect of the present disclosure, in the human-powered vehicle control device for a human-powered vehicle according to the second or third aspect, the electronic controller is configured to start driving the motor upon determining the human drive force has become greater than or equal to a predetermined value.

In accordance with the fourth aspect, since the driving of the motor does not start until the human drive force becomes greater than the predetermined value, the motor is suitably controlled in accordance with the traveling condition in both the first control state and the second control state.

In accordance with a fifth aspect of the present disclosure, in the human-powered vehicle control device for a human-powered vehicle according to the first aspect, the first predetermined period includes a period from a time at which the motor starts to be driven after rotation of a crank of the human-powered vehicle starts to a time at which a third period that is determined in advance elapses, and the second predetermined period includes a period from a time at which the motor starts to be driven after rotation of the crank of the human-powered vehicle starts to a time at which a fourth period that is determined in advance elapses.

In accordance with the fifth aspect, during the second predetermined period including the period from the time at which the motor is driven after the rotation of the crank of the human-powered vehicle starts to the time at which the fourth period determined in advance elapses, the response speed can be slower than during the first predetermined period including the period from the time at which the motor starts to be driven in the first state to the time at which the third period elapses. Therefore, in the second control state and during the second predetermined period including the period from the time at which the motor starts to be driven after the rotation of the crank of the human-powered vehicle starts to the time at which the fourth period elapses, the output of the motor is increased smoothly in a case where the output of the motor is increased in accordance with the human drive force.

In accordance with a sixth aspect of the present disclosure, in the human-powered vehicle control device for a human-powered vehicle according to the first aspect, the first predetermined period includes a period from a time at which rotation of a crank of the human-powered vehicle starts to a time at which a traveling condition of the human-powered vehicle shifts to a first predetermined state, and the second predetermined period includes a period from a time at which rotation of a crank of the human-powered vehicle starts to a time at which a traveling condition of the human-powered vehicle shifts to a second predetermined state.

In accordance with the sixth aspect, during the second predetermined period including the period from the time at which the motor starts to be driven after the rotation of the crank of the human-powered vehicle to the time at which the traveling condition of the human-powered vehicle shifts to the second predetermined state, the response speed is slower than during the first predetermined period including the period from the time at which the motor starts to be driven in the first state to the time at which the traveling condition of the human-powered vehicle shifts to the first predetermined state. Therefore, in the second control state and during the second predetermined period including the period from the time at which the motor starts to be driven after the rotation of the crank of the human-powered vehicle starts to the time at which the traveling condition of the human-powered vehicle shifts to the second predetermined state, the output of the motor is smoothly increased in a case where the output of the motor is increased in accordance with the human drive force.

In accordance with a seventh aspect of the present disclosure, in the human-powered vehicle control device for a human-powered vehicle according to the third or sixth aspect, the traveling condition of the human-powered vehicle includes at least one of a rotation amount of a crank of the human-powered vehicle, a rotational speed of the crank of the human-powered vehicle, a rotation amount of a wheel of the human-powered vehicle, and traveled distance of the human-powered vehicle.

In accordance with the seventh aspect, the second predetermined period can be set to be an appropriate length in accordance with at least one of the rotation amount of the crank of the human-powered vehicle, the rotational speed of the crank of the human-powered vehicle, the rotation amount of the wheel of the human-powered vehicle, and the traveled distance of the human-powered vehicle.

In accordance with an eighth aspect of the present disclosure, in the human-powered vehicle control device for a human-powered vehicle according to any one of the third, sixth, and seventh aspects, the first predetermined state and the second predetermined state differ from each other.

In accordance with the eighth aspect, the first predetermined period in the first control state differs from the second predetermined period in the second control state.

In accordance with a ninth aspect of the present disclosure, in the human-powered vehicle control device for a human-powered vehicle according to any one of the first to eighth aspects, the electronic controller is configured to control the motor so that the response speed becomes equal to a third response speed upon determining the first predetermined period has elapsed while the electronic controller is set to the first control state, and the electronic controller is configured to control the motor so that the response speed becomes equal to the third response speed upon determining the second predetermined period has elapsed while the electronic controller is set to in a case in which the second control state is set.

In accordance with the ninth aspect, after the first predetermined period elapses and after the second predetermined period elapses, the response speed can become equal to the suitable third response speed after the first predetermined period elapses and after the second predetermined period elapses.

In accordance with a tenth aspect, in the human-powered vehicle control device for a human-powered vehicle according to the ninth aspect of the present disclosure, the electronic controller is configured to control the motor so that the first response speed approaches the third response speed as time elapses during the first predetermined period while the electronic controller is set to the first control state, and the electronic controller is configured to control the motor so that the second response speed approaches the third response speed as time elapses during the second predetermined period while the electronic controller is set to the second control state.

In accordance with the tenth aspect, since the first response speed approaches the third response speed as the time elapses during the first predetermined period, a sudden change in the response speed is prevented to smoothly change the response speed when the first predetermined period elapses. In addition, since the second response speed approaches the third response speed as the time elapses during the second predetermined period, a sudden change in the response speed is prevented to smoothly change the response speed when the second predetermined period elapses.

In accordance with an eleventh aspect of the present disclosure, the human-powered vehicle control device for a human-powered vehicle according to the first to tenth aspects, the electronic controller is configured to increase the first response speed for a case where a vehicle speed of the human-powered vehicle is greater than or equal to a first vehicle speed from the first response speed for a case in which the vehicle speed of the human-powered vehicle is less than the first vehicle speed while the electronic controller is set to the first control state.

In accordance with the eleventh aspect, in a case set in the first control state while the vehicle speed of the human-powered vehicle is greater than or equal to the first vehicle speed, the first response speed is faster than the case in which the vehicle speed of the human-powered vehicle is less than the first vehicle speed. Therefore, in the case in which the human-powered vehicle is greater than or equal to the first vehicle speed, the output of the motor is increased earlier than the case in which the human-powered vehicle is less than the first vehicle speed. For example, in a case in which the crank starts to rotate from a state where the crank is stopped while the human-powered vehicle is traveling at the first vehicle speed or greater, the output of the motor is increased earlier than a case in which the crank starts to rotate from a state where the crank is stopped in a state in which the human-powered vehicle is stopped.

In accordance with a twelfth aspect of the present disclosure, in the human-powered vehicle control device for a human-powered vehicle according to the first to tenth aspects the electronic controller is configured to increase the second response speed from the second response speed for a state in which the vehicle speed of the human-powered vehicle in the second predetermined period is less than a second vehicle speed while the motor is not being driven upon determining a state exists in which the vehicle speed of the human-powered vehicle in the second predetermined period is greater than or equal to a second vehicle speed while the motor is not being driven.

In accordance with the twelfth aspect, in a case set in the second control state while the vehicle speed of the human-powered vehicle is greater than or equal to the second vehicle speed, the second response speed is faster than the case in which the vehicle speed of the human-powered vehicle is less than the second vehicle speed. Therefore, in the case in which the human-powered vehicle is greater than or equal to the second vehicle speed, the output of the motor is increased earlier than the case in which the human-powered vehicle is less than the second vehicle speed. For example, in a case in which the crank starts to rotate from a state where the crank is stopped in a case in which the human-powered vehicle is traveling at the second vehicle speed or greater, the output of the motor is increased earlier than a case in which the crank starts to rotate from a state where the crank is stopped in a case in which the human-powered vehicle is stopped.

In accordance with a thirteenth aspect of the present disclosure, in the human-powered vehicle control device for a human-powered vehicle according to any one of the first to twelfth aspects the electronic controller is configured to control the motor so that the first response speed becomes equal to a fourth response speed and controls the motor so that the second response speed becomes equal to a fifth response speed upon determining the human-powered vehicle is traveling on a road surface having an uphill inclination angle that is larger than or equal to a predetermined angle. The fourth response speed is faster than the first response speed, and the fifth response speed is faster than the second response speed.

In accordance with the thirteenth aspect, in a case in which the road surface on which the human-powered vehicle is traveling is an uphill of larger than or equal to the predetermined angle, the response speed is fast. Therefore, in the case in which the road surface on which the human-powered vehicle is traveling is an uphill of larger than or equal to the predetermined angle, the output of the motor is increased early.

In accordance with a fourteenth aspect of the present disclosure, in the human-powered vehicle control device for a human-powered vehicle according to any one of the first to thirteenth aspects the electronic controller is configured to control the motor so that the first response speed becomes equal to a sixth response speed and controls the motor so that the second response speed becomes equal to a seventh response speed upon determining the human-powered vehicle is traveling on a road surface having a downhill inclination angle that is larger than or equal to a predetermined angle. The sixth response speed is slower than the first response speed, and the seventh response speed is slower than the second response speed.

In accordance with the fourteenth aspect, in the case in which the road surface on which the human-powered vehicle is traveling is a downhill of larger than or equal to the predetermined angle, the response speed is slow. Therefore, in the case in which the road surface on which the human-powered vehicle is traveling is a downhill of larger than or equal to the predetermined angle, an increase in the output of the motor is reduced.

In accordance with a fifteenth aspect of the present disclosure, in the human-powered vehicle control device for a human-powered vehicle according to any one of the first to fourteenth aspects, the electronic controller further includes a filter that changes a response speed of the motor.

In accordance with the fifteenth aspect, the response speed is suitably changed by the filter.

In accordance with a sixteenth aspect of the present disclosure, in the human-powered vehicle control device for a human-powered vehicle according to the fifteenth aspect, the electronic controller is configured to change a gain of the filter to change the response speed.

In accordance with the sixteenth aspect, the response speed is suitably changed by changing the gain of the filter.

A human-powered vehicle control device for a human-powered vehicle in accordance with a seventeenth aspect of the present disclosure includes an electronic controller that controls a motor used to assist in propulsion of the human-powered vehicle. The electronic controller is configured to be selectively settable to a first control state that controls the motor in accordance with human drive force and a second control state that controls the motor in accordance with the human drive force so that a ratio of an output of the motor to the human drive force is greater than that of the first control state The electronic controller is configured to control the motor so that a response speed of the motor with respect to a change in the human drive force during a first predetermined period becomes equal to a first response speed and controls the motor so that the response speed becomes equal to a third response speed in a case in which the first predetermined period elapses while the electronic controller is set to the first control state. The electronic controller is configured to control the motor so that the response speed during a second predetermined period including the first predetermined period becomes equal to a second response speed that differs from the first response speed and controls the motor so that the response speed becomes equal to the third response speed in a case in which the second predetermined period elapses while the electronic controller is set to the second control state.

In accordance with the seventeenth aspect, in the second control state where the ratio of the output of the motor to the human drive force is greater than the first control state, it is possible to make the response speed different from the case of the first control state. Therefore, the response speed during the second predetermined period in the second control state is set to the proper second response speed during the second predetermined period in the second control state.

In accordance with an eighteenth aspect of the present disclosure, in the human-powered vehicle control device for a human-powered vehicle according to the seventeenth aspect, the third response speed differs from the first response speed and the second response speed.

In accordance with the eighteenth aspect, after the first predetermined period elapses and after the second predetermined period elapses, the response speed is equal to the suitable third response speed after the first predetermined period elapses and after the second predetermined period elapses.

In accordance with a nineteenth aspect of the present disclosure, in the human-powered vehicle control device for a human-powered vehicle according to the seventeenth aspect, the third response speed is higher than the first response speed and the second response speed.

In accordance with the nineteenth aspect, the motor is controlled with high responsiveness with respect to a change in the human drive force after the first predetermined period elapses and after the second predetermined period elapses.

The human-powered vehicle control device for a human-powered vehicle in accordance with the present disclosure can suitably control the motor in accordance with the traveling condition.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
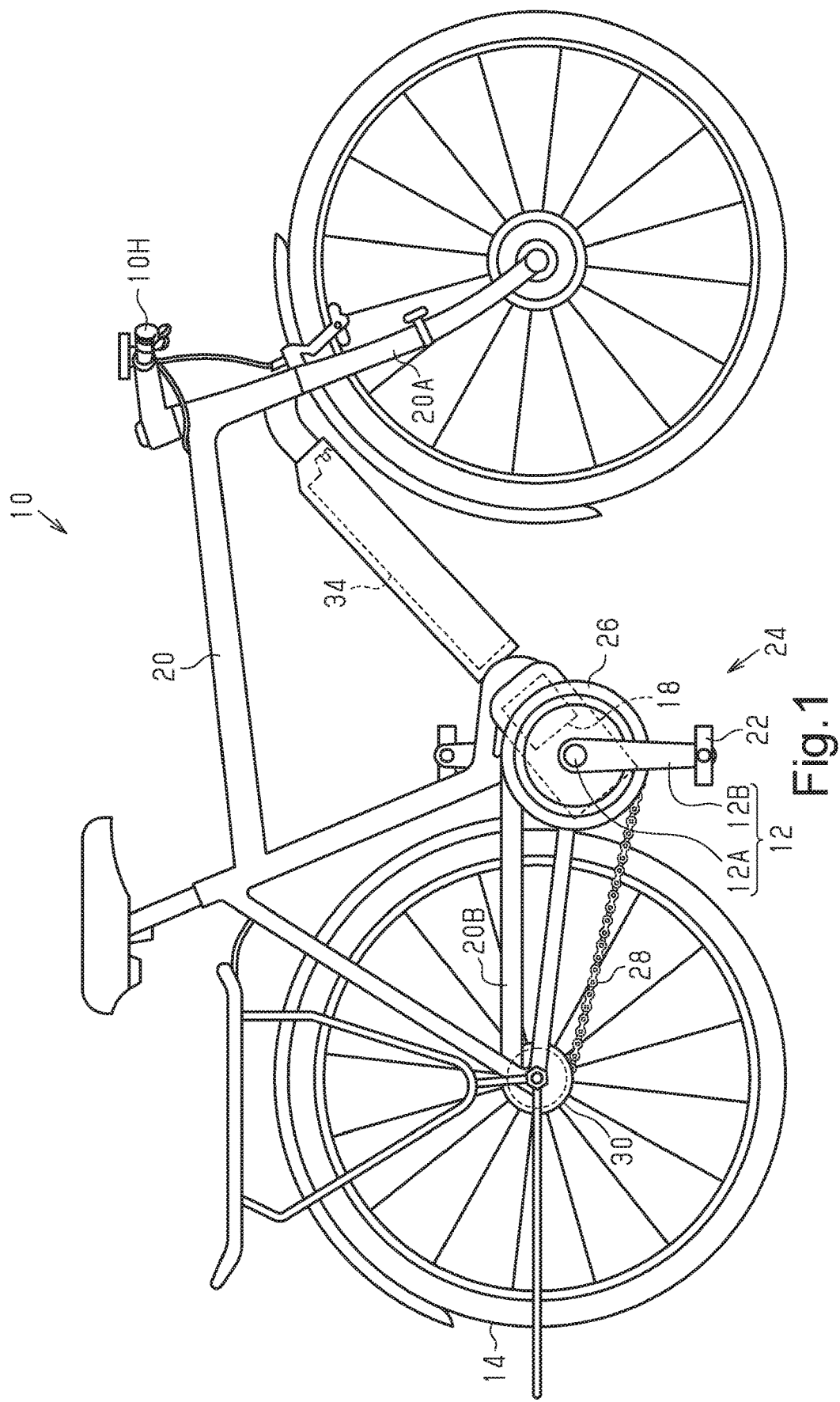
FIG. 1 is a side view of a human-powered vehicle including a human-powered vehicle control device in accordance with a first embodiment.

As seen in FIG. 1, a human-powered vehicle 10 is illustrated that is equipped with a human-powered vehicle control device 50 for a human-powered vehicle in accordance with a first embodiment will be described with reference to FIGS. 1 to 6B. Hereinafter, the human-powered vehicle control device 50 for the human-powered vehicle 10 will be simply be referred to as the control device 50. The control device 50 is provided on a human-powered vehicle 10. The human-powered vehicle 10 is a vehicle that can be driven by at least human drive force. The human-powered vehicle 10 includes, for example, a bicycle. The human-powered vehicle 10 also includes, for example, a vehicle having a monocycle and three or more wheels irrespective of the number of wheels. Examples of a bicycle include a mountain bike, a road bike, a city bike, a cargo bike, and a recumbent bicycle. Hereinafter, in the first embodiment, the human-powered vehicle 10 will be described as a bicycle.

As shown in FIG. 1, the human-powered vehicle 10 includes an input rotary body 12, a driving wheel 14, and a motor 18. The human-powered vehicle 10 further includes a frame 20. The human drive force is input to the input rotary body 12. The input rotary body 12 includes a crank. The input rotary body 12 includes a crankshaft 12A rotatable with respect to the frame 20 and a pair of crank arms 12B respectively provided on two axial ends of the crankshaft 12A. Each of the crank arms 12B is connected to one of a pair of pedals 22. The driving wheel 14 is driven by rotating the input rotary body 12. The driving wheel 14 is supported by the frame 20. The input rotary body 12 and the driving wheel 14 are connected to each other by a drive mechanism 24. The drive mechanism 24 includes a first rotary body 26 coupled to the crankshaft 12A. The crankshaft 12A and the first rotary body 26 can be coupled to each other by a first one-way clutch. The first one-way clutch is configured to rotate the first rotary body 26 forward in a case where the input rotary body 12 is rotated forward and is configured so as not to rotate the first rotary body 26 backward in a case where the input rotary body 12 is rotated backward. The first rotary body 26 includes a sprocket, a pulley, or a bevel gear. The drive mechanism 24 further includes a connection member 28 and a second rotary body 30. The connection member 28 transmits a rotating force of the first rotary body 26 to the second rotary body 30. The connection member 28 includes, for example, a chain, a belt, or a shaft.

The second rotary body 30 is connected to the driving wheel 14. The second rotary body 30 includes a sprocket, a pulley, or a bevel gear. It is preferable that a second one-way clutch be provided between the second rotary body 30 and the driving wheel 14. The second one-way clutch is configured to rotate the driving wheel 14 forward in a case where the second rotary body 30 is rotated forward and configured so as not to rotate the driving wheel 14 backward in a case where the second rotary body 30 is rotated backward.

The human-powered vehicle 10 includes a front wheel and a rear wheel. The front wheel is attached to the frame 20 by a front fork. A handlebar 10H is connected to the front fork via a stem. In the following embodiments, the rear wheel will be referred to as the driving wheel 14 but the front wheel can be the driving wheel 14.

Figure 2:
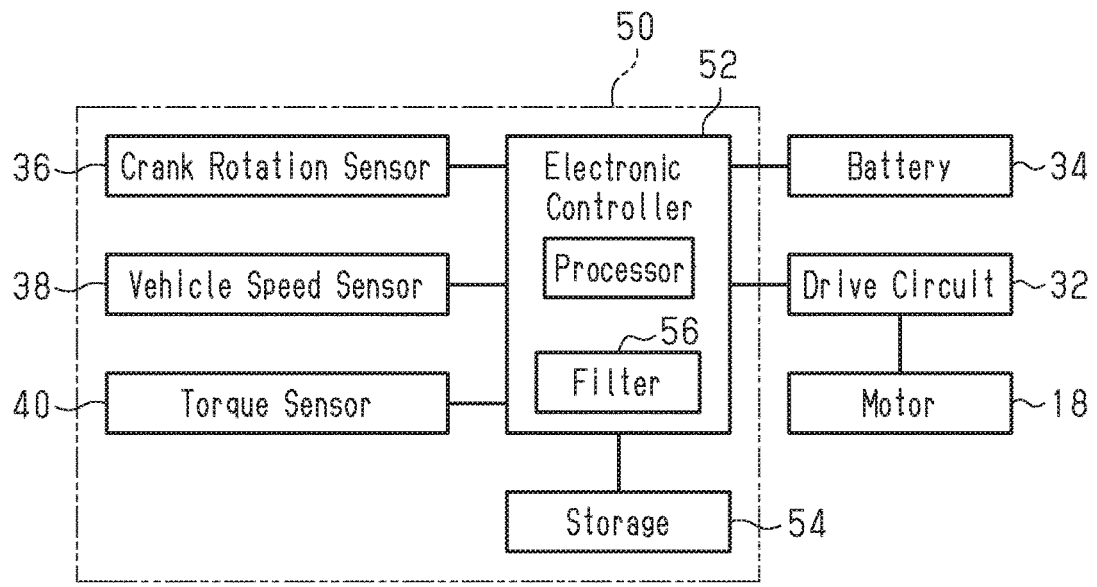
FIG. 2 is a block diagram showing an electrical configuration of the human-powered vehicle control device for the human-powered vehicle in accordance with the first embodiment.

As shown in FIG. 2, the human-powered vehicle 10 further includes a drive circuit 32 of the motor 18, a battery 34, a crank rotation sensor 36, a vehicle speed sensor 38, a torque sensor 40, and the control device 50.

The motor 18 and the drive circuit 32 are preferably provided in the same housing. The drive circuit 32 controls electric power supplied from the battery 34 to the motor 18. The drive circuit 32 is connected to the electronic controller 52 of the control device 50 so as to communicate with the electronic controller 52 of the control device 50 through wired or wireless connection. The drive circuit 32 is configured to communicate with the electronic controller 52, for example, by serial communication. The drive circuit 32 drives the motor 18 in response to a control signal from the electronic controller 52. The drive circuit 32 can be included in the control device 50 or can be included in the electronic controller 52. The motor 18 assists in propulsion of the human-powered vehicle 10. The motor 18 includes an electric motor. The motor 18 is provided so as to transmit rotation to a transmission path of human drive force from the pedal 22 to the rear wheel or to the front wheel. The motor 18 is provided on the frame 20, the rear wheel, or the front wheel of the human-powered vehicle 10. In one example, the motor 18 is coupled to a power transmission path from the crankshaft 12A to the first rotary body 26. It is preferable that the power transmission path between the motor 18 and the crankshaft 12A be provided with the one-way clutch so that the motor 18 is not rotated by the rotating force of the input rotary body 12 in a case where the human-powered vehicle 10 rotates the crankshaft 12A in a forward direction. The housing provided with the motor 18 and the drive circuit 32 can be provided with components other than the motor 18 and the drive circuit 32, for example, a reduction gear that decelerates and outputs the rotation of the motor 18.

The battery 34 shown in FIG. 2 includes one or more battery cells. The battery cell includes a rechargeable battery. The battery 34 is provided on the human-powered vehicle 10 and supplies electric power to other electrical components, such as the motor 18 and the control device 50, which are electrically connected by wires to the battery 34. The battery 34 is connected to the electronic controller 52 so as to communicate with the electronic controller 52 through wired or wireless connection. The battery 34 is configured to communicate with the electronic controller 52, for example, through power line communication (PLC). The battery 34 can be attached to the outside of the frame 20 or at least partially accommodated inside the frame 20.

The crank rotation sensor 36 shown in FIG. 2 detects the rotational speed of the input rotary body 12. The crank rotation sensor 36 is attached to the housing, which is provided on the frame 20, or the motor 18 of the human-powered vehicle 10. The crank rotation sensor 36 includes a magnetic sensor outputting a signal corresponding to the intensity of a magnetic field. An annular magnet having a magnetic field of which intensity is changed in a circumferential direction is provided on the crankshaft 12A or in the power transmission path between the crankshaft 12A and the first rotary body 26. The crank rotation sensor 36 is connected to the electronic controller 52 so as to communicate with the electronic controller 52 through wired or wireless connection. The crank rotation sensor 36 outputs a signal corresponding to the rotational speed of the input rotary body 12 to the electronic controller 52.

The crank rotation sensor 36 can be provided on a member that is rotated integrally with the crankshaft 12A in the transmission path of the human drive force from the crankshaft 12A to the first rotary body 26. For example, the crank rotation sensor 36 can be provided on the first rotary body 26 in a case where there is no one-way clutch between the crankshaft 12A and the first rotary body 26.

The vehicle speed sensor 38 detects the rotational speed of the wheel. The vehicle speed sensor 38 is electrically connected to the electronic controller 52 through wired or wireless connection. The vehicle speed sensor 38 is connected to the electronic controller 52 so as to communicate with the electronic controller 52 through wired or wireless connection. The vehicle speed sensor 38 outputs the signal corresponding to the rotational speed of the wheel to the electronic controller 52. The electronic controller 52 calculates a vehicle speed V of the human-powered vehicle 10 based on the rotational speed of the wheel. The electronic controller 52 stops the motor 18 if the vehicle speed V becomes greater than or equal to the predetermined value. The predetermined value is, for example, 25 Km per hour or 45 Km per hour. It is preferable that the vehicle speed sensor 38 include a magnetic lead formed by a reed switch or a Hall element. The vehicle speed sensor 38 can be configured to be attached to a chain stay 20B of the frame 20 so as to detect a magnet attached to the rear wheel or can be configured to be provided on the front fork 20A so as to detect a magnet attached to the front wheel.

The torque sensor 40 is provided in the housing including the motor 18. The torque sensor 40 detects the human drive force TA input to the input rotary body 12. The torque sensor 40 is provided on, for example, an upstream side of a first one-way clutch in the power transmission path. The torque sensor 40 includes a strain sensor, a magnetostrictive sensor, or the like. The strain sensor includes a strain gauge. In a case where the torque sensor 40 includes the strain sensor, the strain sensor is provided on an outer circumference of the rotary body included in the power transmission path. The torque sensor 40 can include a wireless or wired communicator. The communicator of the torque sensor 40 is configured to communicate with the electronic controller 52.

The control device 50 includes the electronic controller 52. The term "electronic controller" or "controller" as used herein refers to hardware that executes a software program. In one example, the control device 50 further includes a storage 54. The electronic controller 52 includes a processor that executes control programs determined in advance. The processor includes, for example, a central processing unit (CPU) or a micro-processing unit (MPU). The electronic controller 52 can include one or more microcomputers. The controller 52 can be formed of one or more semiconductor chips that are mounted on a printed circuit board. The storage 54 stores various control programs and information used for various control processing. The storage 54 is any computer storage device or any computer readable medium with the sole exception of a transitory, propagating signal. The storage 54 includes, for example, a non-volatile memory and a volatile memory. The electronic controller 52 and the storage 54 are provided, for example, in the housing provided with the motor 18.

The electronic controller 52 operatively coupled to the motor 18 and is configured to control the motor 18. The electronic controller 52 is configured to control the motor 18 according to the human drive force TA input to the human-powered vehicle 10. The electronic controller 52 can include control circuits located at separate positions. For example, some of the control circuits in the electronic controller 52 can be provided in the housing, which includes the motor 18, and the remaining control circuits of the electronic controller 52 can be provided in a shifting device. The electronic controller 52 is configured to switch a plurality of control states having different output characteristics of the motor 18 with respect to a human drive force TA.

The electronic controller 52 is configured to switch two control states having different output characteristics of the motor 18 with respect to a human drive force TA. The electronic controller 52 controls the motor 18 so that the ratio A of the output of the motor 18 to the human drive force TA input to the human-powered vehicle 10 is different in each of two control states. The ratio of the torque of the output of the motor 18 to the torque of the human drive force TA input to the human-powered vehicle 10 can be referred to as the ratio A. The ratio of the power (watt) of the output of the motor 18 to the power (watt) of the human drive force input to the human-powered vehicle 10 can be referred to as the ratio A. The power of the human drive force is calculated by multiplying the human drive force TA by the crank rotating speed. In a case where the output of the motor 18 is input to a human drive force path via the reduction gear, the output of the reduction gear is set as the output of the motor 18. The two control states include a first control state, in which the ratio A is a first ratio A1, and a second control state, in which the ratio A is a second ratio A2 greater than the first ratio A1.

The electronic controller 52 is selectively settable to the first control state and the second control state. The first control state and the second control state are switched, for example, by operating an operation portion (not shown) of a user operated input (e.g., a lever, a switch, a push button, etc. The electronic controller 52 sets a response speed R of the motor 18 so that the response speed R with respect to a change in the human drive force TA is different in the first control state and the second control state. The response speed R is expressed as an actual changing rate of the output TM of the motor 18 with respect to a change in a value of a case where the human drive force TA is multiplied by the ratio A set for the control state. The electronic controller 52 starts driving the motor 18 if the human drive force TA is greater than or equal to a predetermined value TAX.

In the first control state, the electronic controller 52 is configured to control the motor 18 is accordance with the human drive force TA. In the case in which the first control state is set, the electronic controller 52 controls the motor 18 so that the response speed R of the motor with respect to the change in the human drive force TA in a first predetermined period S1 becomes equal to a first response speed R1. The first predetermined period S1 includes a period from a time at which the motor 18 starts to be driven to a time at which the traveling condition of the human-powered vehicle 10 shifts to a first predetermined state. The traveling condition of the human-powered vehicle 10 includes a rotation amount DC of the crank of the human-powered vehicle 10. The first predetermined state is a state in which the rotation amount DC of the crank from the time at which the motor 18 starts to be driven reaches a first rotation amount DC1. The first predetermined period S1 is a period in which the rotation amount DC of the crank from the time at which the motor 18 starts to be driven reaches the first rotation amount DC1.

In the second control state, the electronic controller 52 is configured to control the motor 18 in accordance with the human drive force TA so that the ratio A of the output of the motor 18 to the human drive force TA is greater than the case of the first control state. In the case in which the second control state is set, the electronic controller 52 controls the motor 18 so that the response speed R in a second predetermined period S2 including the first predetermined period S1 becomes equal to a second response speed R2 that is slower than the first response speed R1. The second predetermined period S2 includes a period from a time at which the motor 18 starts to be driven to a time at which the traveling condition of the human-powered vehicle 10 shifts to a second predetermined state. The traveling condition of the human-powered vehicle 10 includes a rotation amount DC of the crank of the human-powered vehicle 10. The second predetermined state is a state in which the rotation amount DC of the crank from the time at which the motor 18 starts to be driven reaches a second rotation amount DC2. The second predetermined period S2 is a period in which the rotation amount DC of the crank from the time at which the motor 18 starts to be driven reaches the second rotation amount DC2.

The first predetermined state and the second predetermined state differ from each other. Specifically, the first rotation amount DC1 and the second rotation amount DC2 are set to different values. The first rotation amount DC1 is greater than the second rotation amount DC2. It is preferable that the first rotation amount DC1 be less than or equal to 90°. It is preferable that the second rotation amount DC2 be less than or equal to 90°. It is preferable that the second rotation amount DC2 be less than or equal to 30°.

In a case in which the first control state is set, the electronic controller 52 is configured to control the motor 18 so that the response speed R in the first predetermined period S1 becomes equal to the first response speed R1. If the first predetermined period S1 elapses, then the electronic controller 52 controls the motor 18 so that the response speed R becomes equal to a third response speed R3. In a case in which the first control state is set and the first predetermined period S1 elapses, the electronic controller 52 is configured to control the motor 18 so that the response speed R becomes equal to the third response speed R3. In a case in which the first control state is set, the electronic controller 52 is configured to control the motor 18 so that the first response speed R1 approaches the third response speed R3 as time elapses during the first predetermined period S1.

In the case in which the second control state is set, the electronic controller 52 is configured to control the motor 18 so that the response speed R in the second predetermined period S2 including the first predetermined period S1 becomes equal to the second response speed R2, which different from the first response speed R1. If the second predetermined period S2 elapses, then the electronic controller 52 controls the motor 18 so that the response speed R becomes equal to the third response speed R3. In a case in which the second control state is set and the second predetermined period S2 elapses, the electronic controller 52 is configured to control the motor 18 so that the response speed R becomes equal to the third response speed R3. In a case in which the second control state is set, the electronic controller 52 controls the motor 18 so that the second response speed R2 approaches the third response speed R3 as time elapses during the second predetermined period S2.

The third response speed R3 differs from the first response speed R1 and the second response speed R2. The third response speed R3 is faster than the first response speed R1 and the second response speed R2.

Figure 3:
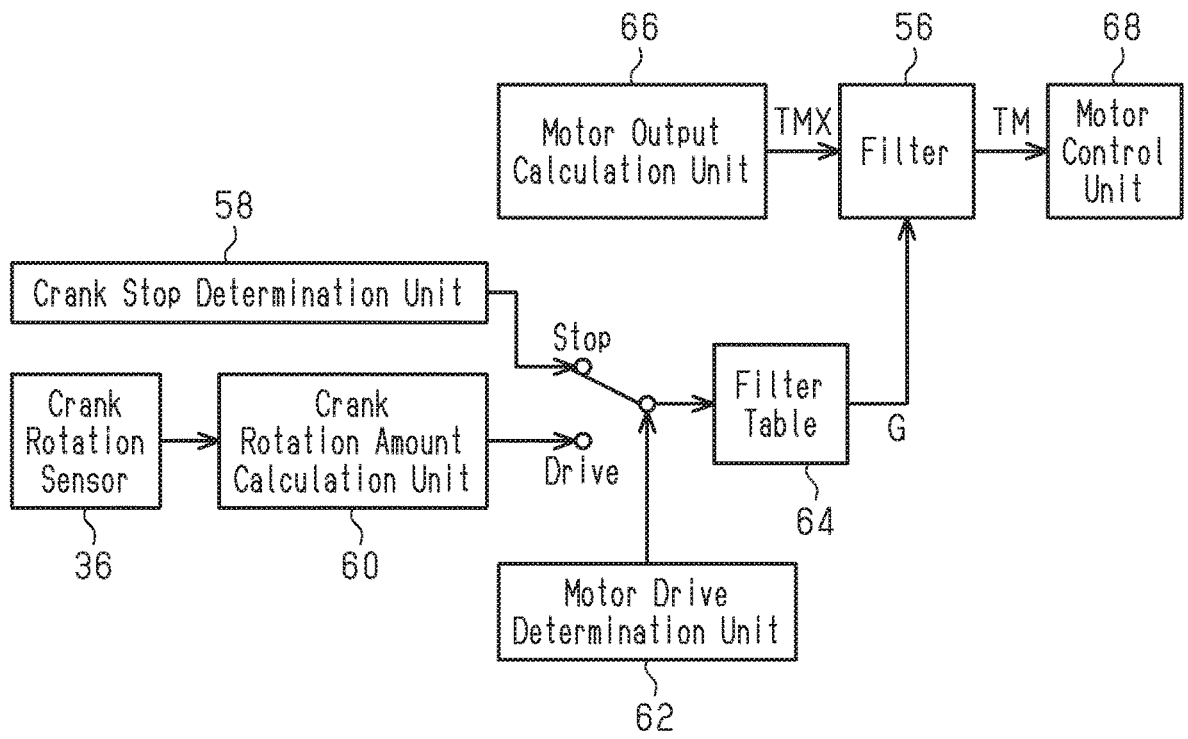
FIG. 3 is a block diagram showing an electrical configuration related to filter processing of the electronic controller illustrated in FIG. 2.

As shown in FIG. 3, the electronic controller 52 further includes a filter 56 that changes the response speed R of the motor 18. The electronic controller 52 is configured to change the response speed R by changing a gain G of the filter 56. The electronic controller 52 further includes a crank stop determination unit 58, a crank rotation amount calculation unit 60, a motor drive determination unit 62, a filter table 64, a motor output calculation unit 66, and a motor electronic controller 68.

The crank stop determination unit 58 determines whether the rotation of the crankshaft 12A is stopped from an output of the crank rotation sensor 36. The crank rotation amount calculation unit 60 calculates the rotation amount DC from the output of the crank rotation sensor 36 in a case in which the rotation of the crankshaft 12A starts from a state where the rotation of the crankshaft 12A is stopped. The motor drive determination unit 62 determines whether the motor 18 is driven. The connection state between the crank rotation amount calculation unit 60 and the filter table 64 is switched according to the determination results of the crank stop determination unit 58 and the motor drive determination unit 62. More specifically, if the crank stop determination unit 58 determines that the rotation of the crankshaft 12A is stopped, then the crank rotation amount calculation unit 60 and the filter table 64 are not connected to each other. If the motor drive determination unit 62 determines that the rotation of the crankshaft 12A is stopped, then the crank rotation amount calculation unit 60 and the filter table 64 are connected to each other, and the output of the crank rotation amount calculation unit 60 is input to the filter table 64.

Figure 4:
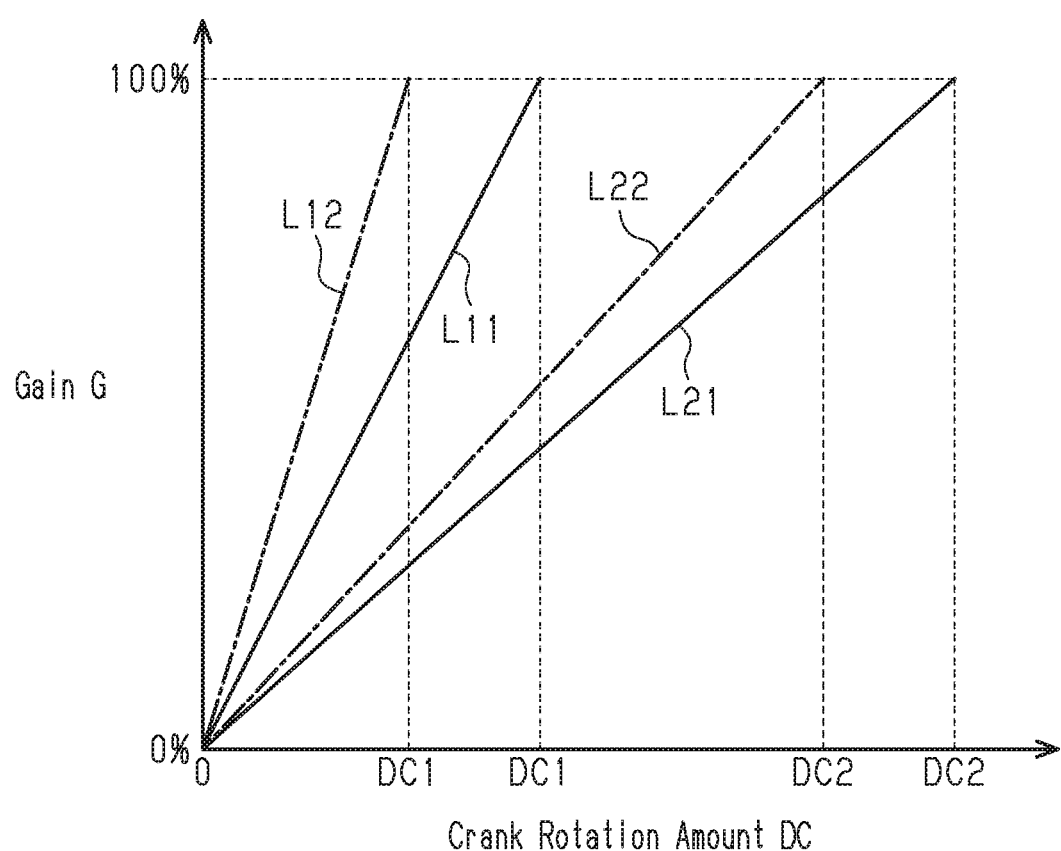
FIG. 4 is a graph showing the relationship between a rotation amount of a crank and a gain used for the filter processing of the electronic controller illustrated in FIG. 2.

As shown in FIG. 4, in the filter table 64, the gain G is set to increase as the rotation amount DC of the crank increases. As indicated by a solid line L11 in FIG. 4, a first gain G1 in the first control state is set to be 0% in a case in which the rotation amount DC of the crank is 0. The first gain G1 is linearly increased as the rotation amount DC of the crank increases and set to be 100% if the rotation amount DC of the crank becomes the first rotation amount DC1. The first gain G1 can be increased in a stepped manner as the rotation amount DC of the crank increases or be increased exponentially. As indicated by a solid line L21 in FIG. 4, a second gain G2 in the second control state is set to be 0% in a case in which the rotation amount DC of the crank is 0. The second gain G2 is linearly increased as the rotation amount DC of the crank increases and set to be 100% if the rotation amount DC of the crank becomes the second rotation amount DC2. The second gain G2 can be increased in a stepped manner as the rotation amount DC of the crank increases or can be increased exponentially.

The filter 56 filters the output of the motor output calculation unit 66 according to the output of the filter table 64. Specifically, the filter 56 outputs, to the motor electronic controller 68, the output TM of the motor 18 obtained by multiplying the gain G, which is output from the filter table 64, by the output TMX of the motor 18 obtained by multiplying the human drive force TA, which is calculated by the motor output calculation unit 66, by the ratio A set for each control state. The motor electronic controller 68 outputs a control signal to the drive circuit 32 so that the output of the motor 18 becomes equal to the output TM of the motor 18.

As the gain G approaches 100%, the response speed R approaches the third response speed R3. It is preferable that the third response speed R3 be set by a filter that differs from the filter 56. The third response speed R3 can include an eighth response speed R8 and a ninth response speed R9. The eighth response speed R8 is used in a case in which the human drive force TA is increased. The ninth response speed R9 is used in a case in which the human drive force TA is decreased. It is preferable that the ninth response speed R9 be slower than the eighth response speed R8. The ninth response speed R9 can be slower than the first response speed R1. The filter for setting the third response speed R3 includes, for example, a time constant, and the eighth response speed R8 and the ninth response speed R9 are switched by switching the time constant used in the filter.

In the first control state, the electronic controller 52 is configured to set the first response speed R1 in a case in which a vehicle speed V of the human-powered vehicle 10 is greater than or equal to the first vehicle speed V1 to be faster than the first response speed R1 in a case in which the vehicle speed V of the human-powered vehicle 10 is less than the first vehicle speed V1. Specifically, the first rotation amount DC1 in a case in which the vehicle speed V is greater than or equal to the first vehicle speed V1 is set to be smaller than the first rotation amount DC1 in a case in which the vehicle speed V is less than the first vehicle speed V1. For example, as shown by a single-dashed line L12 in FIG. 4, the first gain G1 in the first control state for a case in which the vehicle speed V is greater than or equal to the first vehicle speed V1 is set to reach 100% earlier than the first gain G1 in the first control state indicated by a solid line L11 in FIG. 4 and in a case in which the vehicle speed V is less than the first vehicle speed V1. It is preferable that the first vehicle speed V1 be set to a value greater than 0 and close to 0. In a case in which the rotation of the crank starts from a state in which the human-powered vehicle 10 stopped traveling, the first response speed R1 is set for a vehicle speed V less than the first vehicle speed V1. In a case in which the rotation of the crank starts from a state in which the crank is temporarily stopped while the human-powered vehicle 10 is traveling, the first response speed R1 is set for a vehicle speed V greater than or equal to the first vehicle speed V1.

The electronic controller 52 is configured to set the second response speed R2 in a state where the vehicle speed V of the human-powered vehicle 10 in the second predetermined period S2 is greater than or equal to the second vehicle speed V2 and the motor 18 is not driven to be faster than the second response speed R2 in a state where the vehicle speed V of the human-powered vehicle 10 in the second predetermined period S2 is less than the second vehicle speed V2 and the motor 18 is not driven. Specifically, the second rotation amount DC2 in a case in which the vehicle speed V is greater than or equal to the second vehicle speed V2 is set to be smaller than the second rotation amount DC2 in a case in which the vehicle speed V is less than the second vehicle speed V2. For example, as shown by a single-dashed line L22 in FIG. 4, the second gain G2 in the second control state in a case in which the vehicle speed V is greater than or equal to the second vehicle speed V2 is set to reach 100% earlier than the second gain G2 in the second control state indicated by a solid line L21 in FIG. 4 in a case in which the vehicle speed V is less than the second vehicle speed V2. It is preferable that the second vehicle speed V2 be set to a value greater than 0 and close to 0. The first vehicle speed V1 can be equal to the second vehicle speed V2. In a case in which the rotation of the crank starts from a state where the traveling of the human-powered vehicle 10 stopped, the second response speed R2 at which the vehicle speed V is less than the second vehicle speed V2 is set. In a case in which the rotation of the crank starts from a state where the crank temporarily stops in a state in which the human-powered vehicle 10 is traveling, the second response speed R2 is set to a vehicle speed V that is greater than or equal to the second vehicle speed V2.

Figure 5:
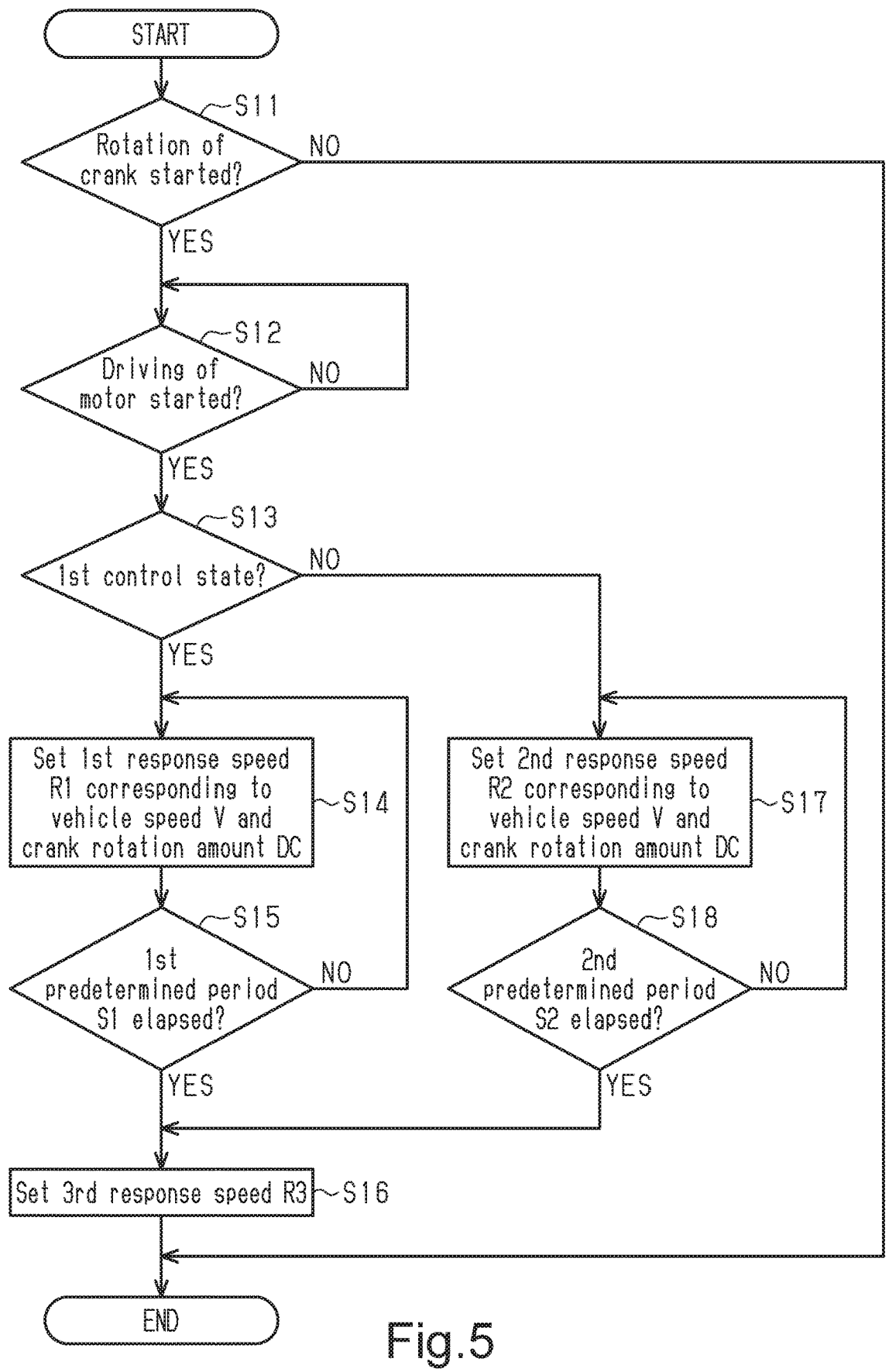
FIG. 5 is a flowchart of a process of changing a response speed executed by the electronic controller illustrated in FIG. 2.

A process of changing the response speed R will now be described with reference to FIG. 5. If electric power is supplied from a battery 34 to the electronic controller 52, the electronic controller 52 is configured to start the process and the process proceeds to step S11 of the flowchart shown in FIG. 5. As long as electric power is supplied, the electronic controller 52 executes processing from step S11 in predetermined cycles.

In step S11, the electronic controller 52 determines whether or not rotation of the crank has started. In a case where the electronic controller 52 determines that the rotation of the crank has not started, the electronic controller 52 ends processing. In a case where the electronic controller 52 determines that rotation of the crank has started, the process proceeds to step S12. The electronic controller 52 determines that the rotation of the crank has started, for example, in at least one of a case in which the rotational speed of the crank has been changed from 0 to a predetermined speed or greater and a case in which a rotational angle of the crank has been changed by a predetermined amount or greater.

In step S12, the electronic controller 52 determines whether or not driving of the motor 18 has started. The electronic controller 52 repeats step S12 until determining that driving of the motor 18 has started. In a case where the electronic controller 52 determines in step S12 that driving of the motor 18 has started, the electronic controller 52 proceeds to step S13.

In step S13, the electronic controller 52 determines whether or not the control state is in the first control state. If the electronic controller 52 determines that the control state is in the first control state, the electronic controller 52 proceeds to step S14. In step S14, the electronic controller 52 sets the first response speed R1 corresponding to the vehicle speed V and the rotation amount DC of the crank. Then, the electronic controller 52 proceeds to step S15. For example, in a case in which the vehicle speed V is less than the first vehicle speed V1, the electronic controller 52 sets the gain G in accordance with the solid line L11 in FIG. 4 and the rotation amount DC of the crank from the time at which the motor 18 starts to be driven. In a case in which the vehicle speed V is greater than or equal to the first vehicle speed V1, the electronic controller 52 sets the gain G in accordance with the single-dashed line L12 in FIG. 4 and the rotation amount DC of the crank from the time at which the motor 18 starts to be driven.

In step S15, the electronic controller 52 determines whether the first predetermined period S1 has elapsed. The electronic controller 52 repeats the processing of steps S14 and S15 until the first predetermined period S1 elapses. For example, in step S12, in a case in which the period from when driving of the motor 18 started is greater than or equal to the first predetermined period S1, the electronic controller 52 determines that the first predetermined period S1 has elapsed. Then, the electronic controller 52 proceeds to step S16. In step S16, the electronic controller 52 sets the response speed R to the third response speed R3 and then ends processing.

In a case where the electronic controller 52 determines in step S13 that the control state is not in the first control state, that is, the control state is in the second control state, the electronic controller 52 proceeds to step S17. In step S17, the electronic controller 52 sets the second response speed R2 corresponding to the vehicle speed V and the rotation amount DC of the crank. Then, the electronic controller 52 proceeds to step S18. For example, when the vehicle speed V is less than the second vehicle speed V2, the electronic controller 52 sets the gain G in accordance with the solid line L21 in FIG. 4 and the rotation amount DC of the crank from the time at which the motor 18 starts to be driven. In a case in which the vehicle speed V is greater than or equal to the second vehicle speed V2, the electronic controller 52 sets the gain G in accordance with the single-dashed line L22 in FIG. 4 and the rotation amount DC of the crank from when driving of the motor 18 started.

In step S18, the electronic controller 52 determines whether or not the second predetermined period S2 has elapsed. The electronic controller 52 repeats steps S17 and S18 until the second predetermined period S2 elapses. For example, in step S12, in a case in which the period from when driving of the motor 18 started is greater than or equal to the second predetermined period S2, the electronic controller 52 determines that the second predetermined period S2 has elapsed and proceeds to step S16. In step S16, the electronic controller 52 sets the response speed R to the third response speed R3 and ends processing.

Figure 6A:
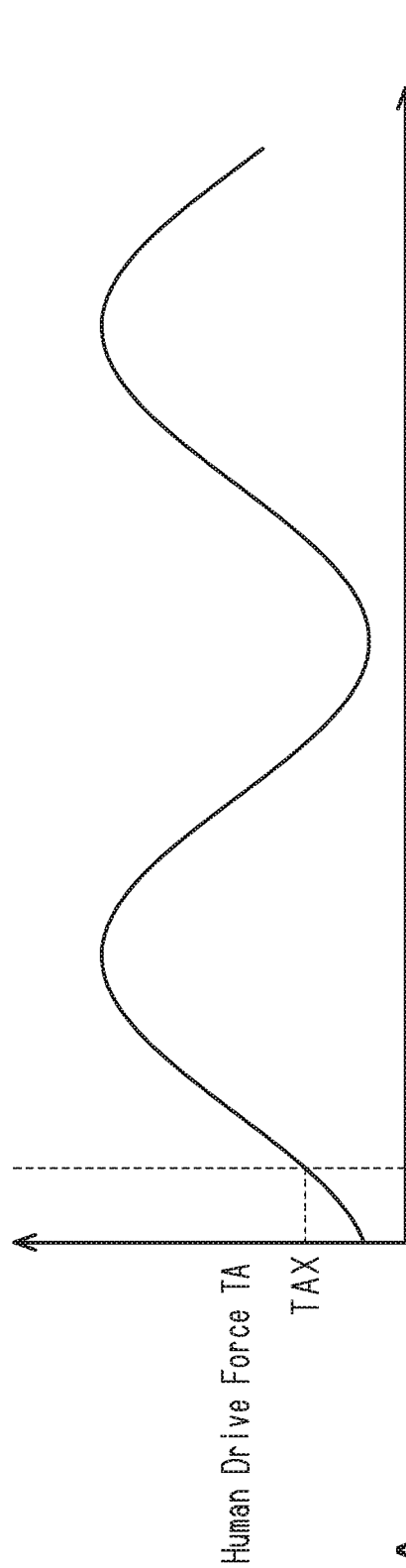
FIGS. 6A and 6B are timing charts showing changes in an output of a motor illustrated in FIG. 2.
Figure 6B:
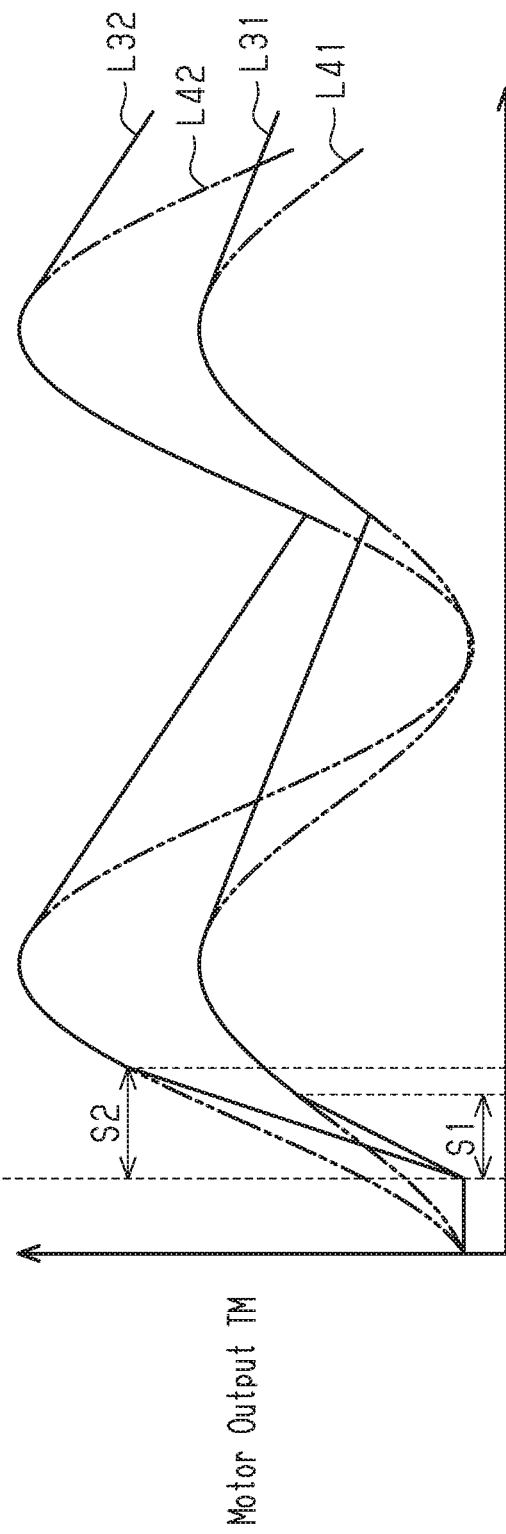

With reference to FIGS. 6A and 6B, an example of a change in the output TM of the motor 18 resulting from a process of changing the response speed R will now be described. A solid line L31 in FIG. 6B indicates the change in the output TM of the motor 18 in the first control state. The solid line L32 in FIG. 6B indicates a change in the output TM of the motor 18 in the second control state. A double-dashed line L41 in FIG. 6B indicates the change in the value obtained by multiplying the human drive force TA by the ratio A in the first control state. A double-dashed line L42 in FIG. 6B indicates a change in the value obtained by multiplying the human drive force TA by the ratio A in the second control state.

If the human drive force TA reaches the predetermined value TAX after the rotation of the crank starts, then driving of the motor 18 is started, and the output TM of the motor 18 starts to increase as the human drive force TA increases.

As indicated by the solid line L31, in the first control state, from when driving of the motor 18 starts to when the first predetermined period S1 elapses, the output TM of the motor 18 is increased with a delay from the value of the double-dashed line L41. In the first control state, during the first predetermined period S1, the output TM of the motor 18 approaches the value of the double-dashed line L41 as time elapses. As the first predetermined period S1 elapses, the output TM of the motor 18 becomes substantially equal to the value of the double-dashed line L41. The electronic controller 52 is configured to control the motor 18 at the eighth response speed R8 until the crank reaches one of a top dead center and a bottom dead center. If the crank is further rotated and reaches one of the top dead center and the bottom dead center and the human drive force TA is decreased, then the electronic controller 52 is configured to control the motor 18 at the ninth response speed R9 that is slower than the eighth response speed R8.

As indicated by the solid line L32, in the second control state, from when driving of the motor 18 starts to when the second predetermined period S2 elapses, the output TM of the motor 18 is increased with a delay from the value of the double-dashed line L42. In the second control state, during the second predetermined period S2, the output TM of the motor 18 approaches the value of the double-dashed line L42 as time elapses. As the second predetermined period S2 elapses, the output TM of the motor 18 becomes substantially equal to the value of the double-dashed line L42. The electronic controller 52 is configured to control the motor 18 at the eighth response speed R8 until the crank reaches one of a top dead center and a bottom dead center. If the crank is further rotated and reaches one of the top dead center and the bottom dead center and the human drive force TA is decreased, then the electronic controller 52 is configured to control the motor 18 at the ninth response speed R9, which is slower than the eighth response speed R8.

Second Embodiment

Figure 7:
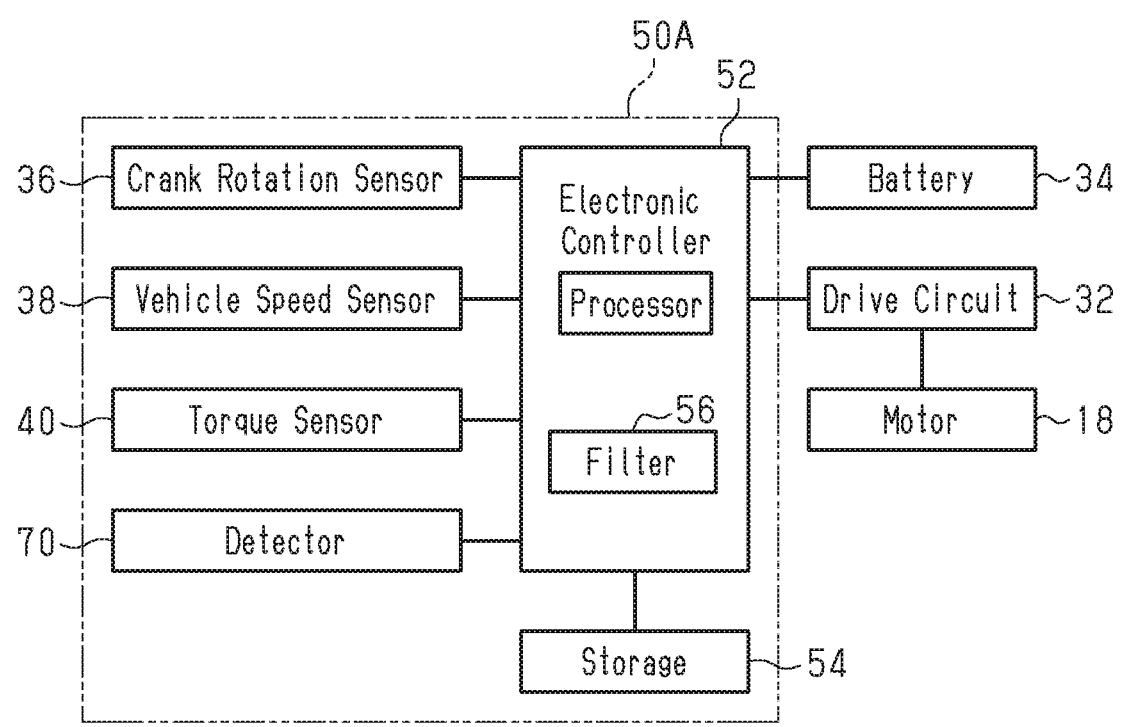
FIG. 7 is a block diagram showing an electrical configuration of a human-powered vehicle control device for a human-powered vehicle in accordance with a second embodiment.
Figure 8:
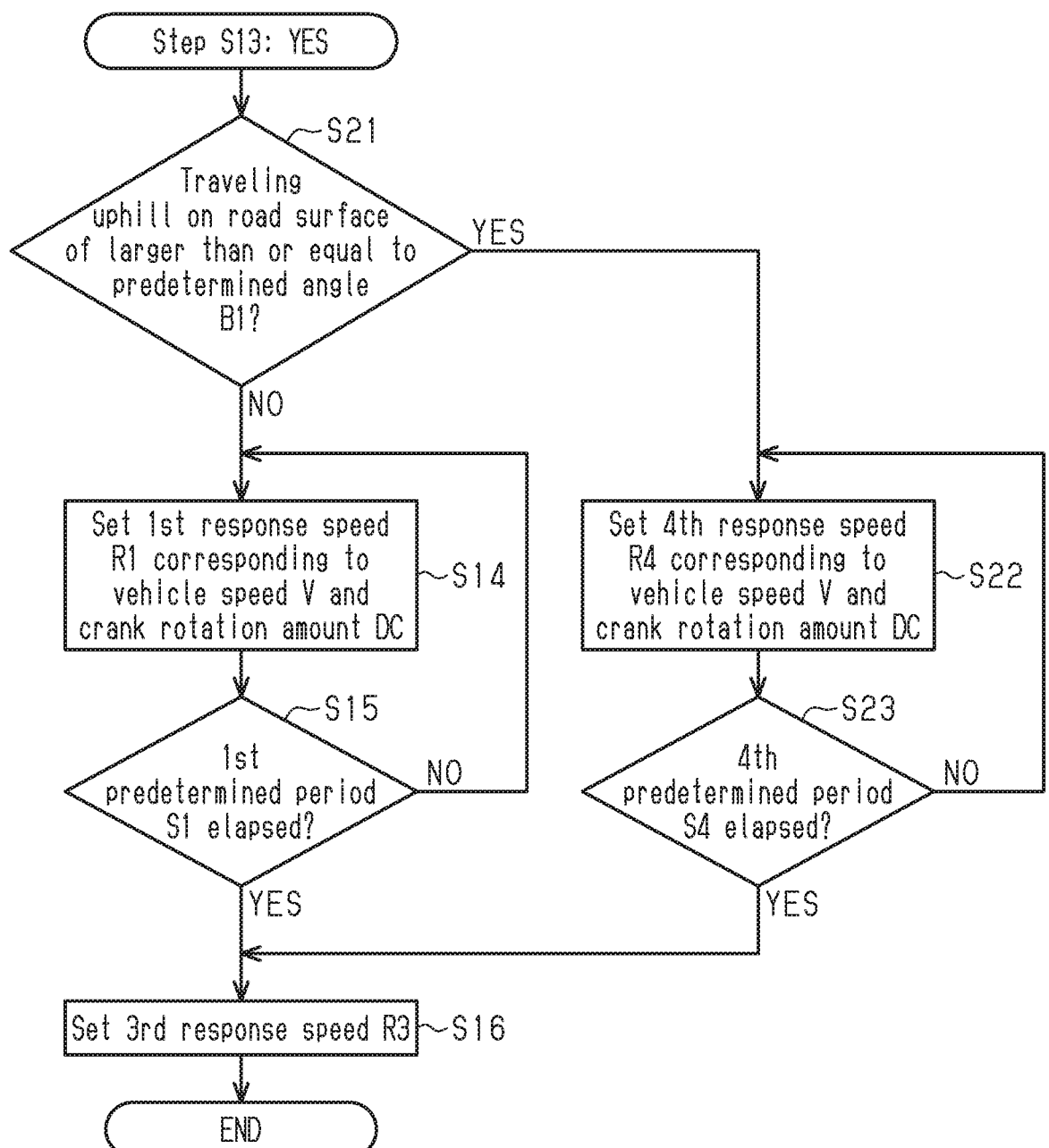
FIG. 8 is a first flowchart of a process of changing a response speed executed by an electronic controller of the human-powered vehicle control device illustrated in FIG. 7.
Figure 9:
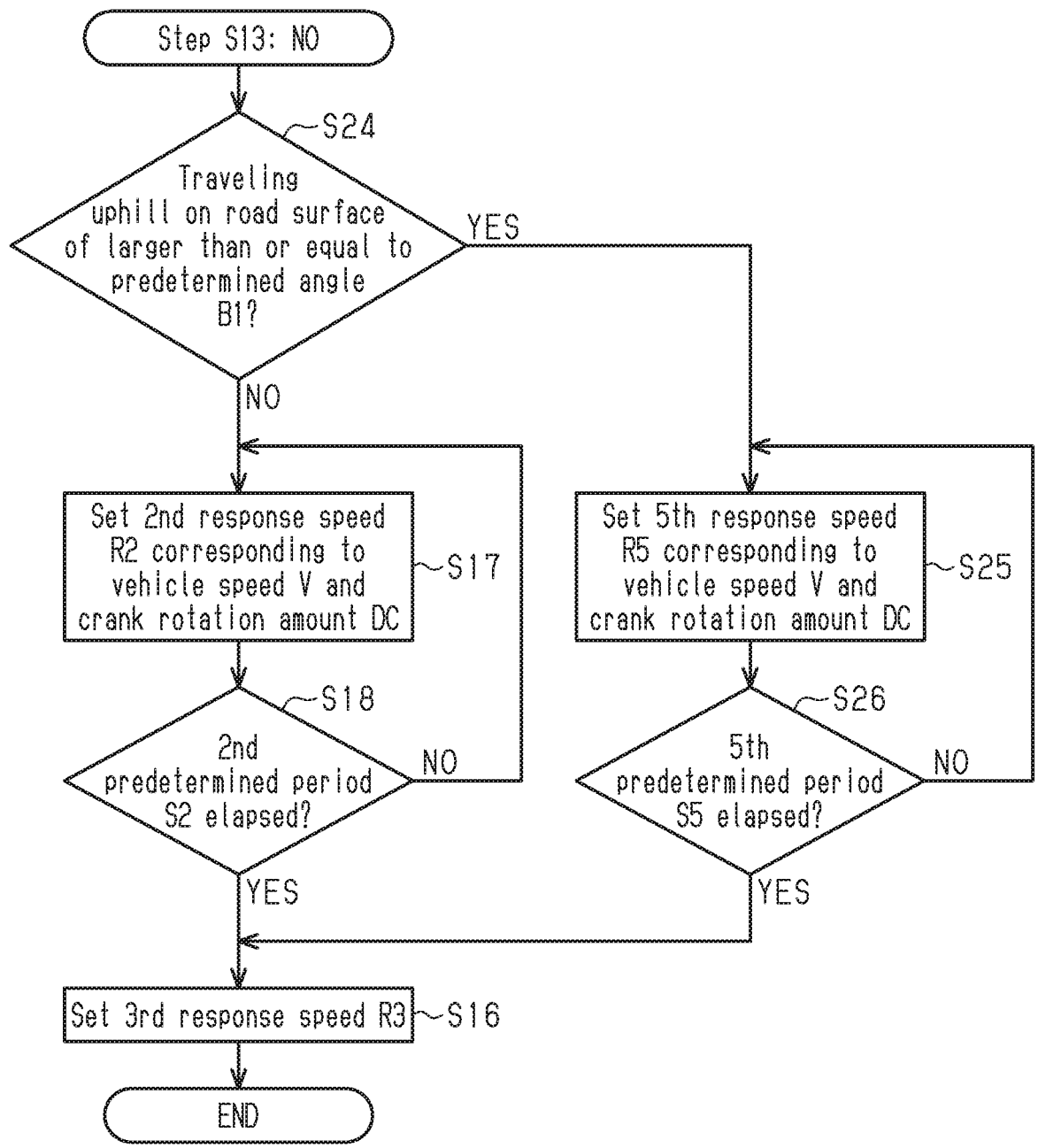
FIG. 9 is a second flowchart of a process of changing the response speed executed by the electronic controller illustrated in FIG. 7.

A control device 50 in accordance with a second embodiment will now be described with reference to FIGS. 7 to 9.

Since the control device 50 in accordance with the second embodiment is the same as the control device 50 in accordance with the first embodiment except in the process of changing a response speed R in a case in which a road surface on which a human-powered vehicle 10 is traveling is an uphill, same reference numerals are given to those components that are the same as the corresponding components of the first embodiment. Such components will not be described in detail.

The control device 50 further includes a detector 70 that detects an angle of the road surface on which the human-powered vehicle 10 is traveling. The detector 70 includes, in one example, a tilt sensor. An example of the tilt sensor is a gyroscope sensor. In another example, the detector 70 includes a global positioning system (GPS) receiving unit. The electronic controller 52 calculates the angle of the road surface on which the human-powered vehicle 10 is traveling in accordance with GPS information acquired by the GPS receiving unit and a road surface gradient included in map information stored in advance in a storage 54. In another example, the detector 70 is a sensor that detects a pitch angle of the human-powered vehicle 10. The sensor that detects the pitch angle of the human-powered vehicle 10 can be an acceleration sensor for one or more axes or a gyroscope sensor for one or more axes.

In the case in which the road surface on which the human-powered vehicle 10 is traveling is an uphill of larger than or equal to a predetermined angle B1, the electronic controller 52 controls a motor 18 so that a first response speed R1 becomes equal to a fourth response speed R4 and controls the motor 18 so that a second response speed R2 becomes equal to a fifth response speed R5. The fourth response speed R4 is faster than the first response speed R1 and the fifth response speed R5 is faster than the second response speed R2. The fourth response speed R4 and the fifth response speed R5 can be equal to each other. The fourth response speed R4 and the fifth response speed R5 differ from the third response speed R3. The predetermined angle B1 is represented by an absolute value.

A process of changing the response speed R will now be described with reference to FIGS. 5, 8, and 9. In the present process, after an affirmative determination in step S13 in FIG. 5, step S21 is performed. Further, after a negative determination in step S13, step S24 is performed.

If the electronic controller 52 determines in step S13 that the control state is a first control state, then the electronic controller 52 proceeds to step S21 and determines whether the human-powered vehicle 10 is traveling on a road surface having an uphill inclination angle that is larger than or equal to the predetermined angle B1. In a case where the electronic controller 52 determines that the human-powered vehicle 10 is traveling on a road surface that does not have an uphill inclination angle that is larger than or equal to the predetermined angle B1, then the electronic controller 52 proceeds to step S14.

If the electronic controller 52 determines in step S21 that the human-powered vehicle 10 is traveling on a road surface having an uphill inclination angle having the predetermined angle B1 or greater, then the electronic controller 52 proceeds to step S22. In step S22, the electronic controller 52 sets the fourth response speed R4 corresponding to a vehicle speed V and a rotation amount DC of the crank. Then, the electronic controller 52 proceeds to step S23. In step S23, the electronic controller 52 determines whether a fourth predetermined period S4 has elapsed. The electronic controller 52 repeats the processing of steps S22 and S23 until the fourth predetermined period S4 elapses. If the electronic controller 52 determines that the fourth predetermined period S4 has elapsed, the electronic controller 52 proceeds to step S16. In step S16, the electronic controller 52 sets the response speed R to the third response speed R3 and then ends processing.

If the electronic controller 52 determines in step S13 that the control state is not a first control state, the electronic controller 52 proceeds to step S24 and the electronic controller 52 determines whether the human-powered vehicle 10 is traveling on a road surface having an uphill inclination angle that is larger than or equal to the predetermined angle B1. In a case where the electronic controller 52 determines that the human-powered vehicle 10 is traveling on a road surface that does not have an uphill inclination angle that is larger than or equal to the predetermined angle B1, the electronic controller 52 proceeds to step S17.

If the electronic controller 52 determines in step S24 that the human-powered vehicle 10 is traveling on a road surface that does not have an uphill inclination angle that is larger than or equal to the predetermined angle B1, then the electronic controller 52 proceeds to step S25. In step S25, the electronic controller 52 sets the fifth response speed R5 corresponding to the vehicle speed V and the rotation amount DC of the crank. Then, the electronic controller 52 proceeds to step S26. In step S26, the electronic controller 52 determines whether a fifth predetermined period S5 elapses. The electronic controller 52 repeats the processing of steps S25 and S26 until the fifth predetermined period S5 has elapsed. If the electronic controller 52 determines that the fifth predetermined period S5 has elapsed, the electronic controller 52 proceeds to step S16. In step S16, the electronic controller 52 sets the response speed R to the third response speed R3 and then ends processing.

Third Embodiment

Figure 10:
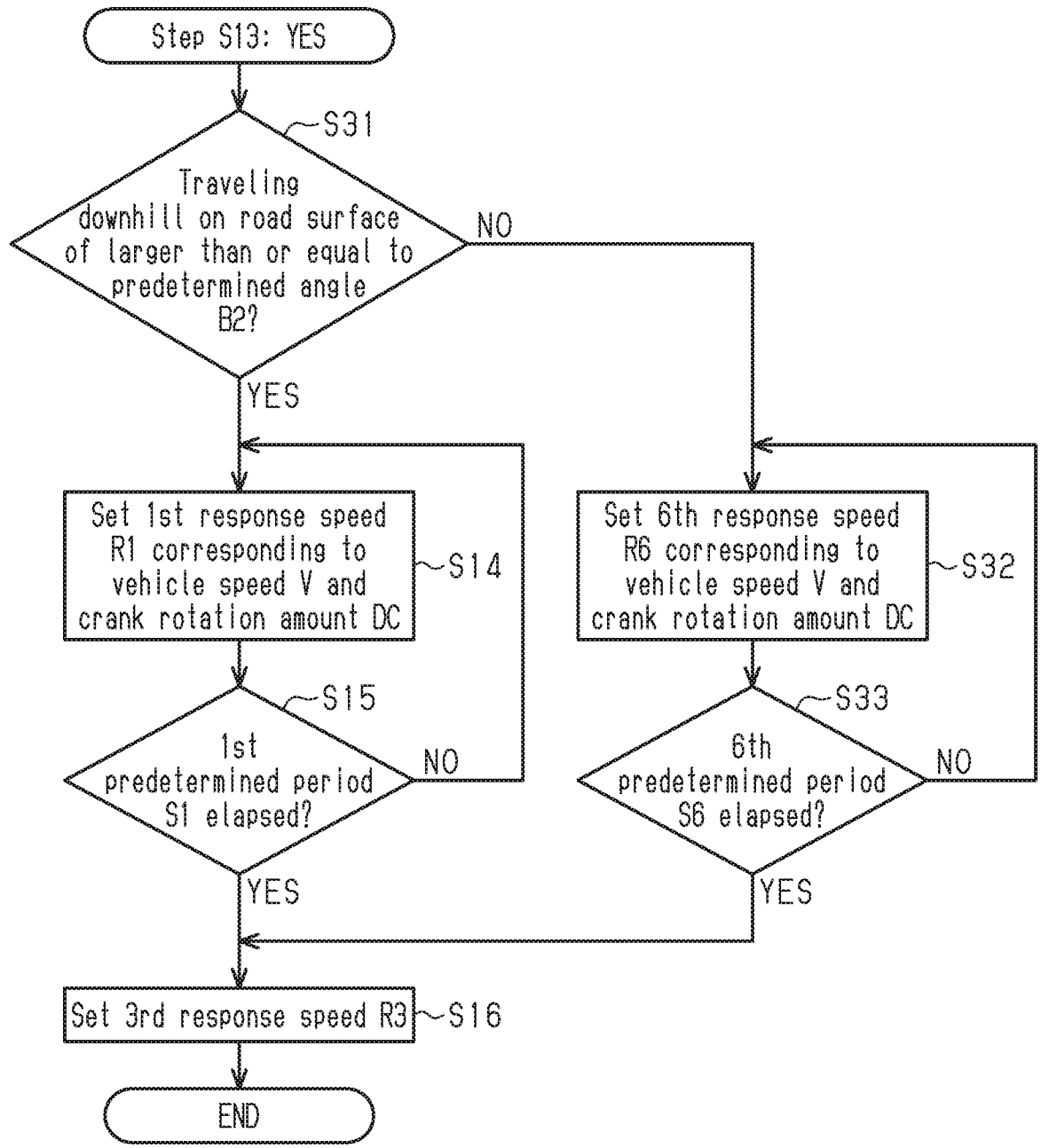
FIG. 10 is a first flowchart of a process of changing a response speed executed by an electronic controller in accordance with a third embodiment.
Figure 11:
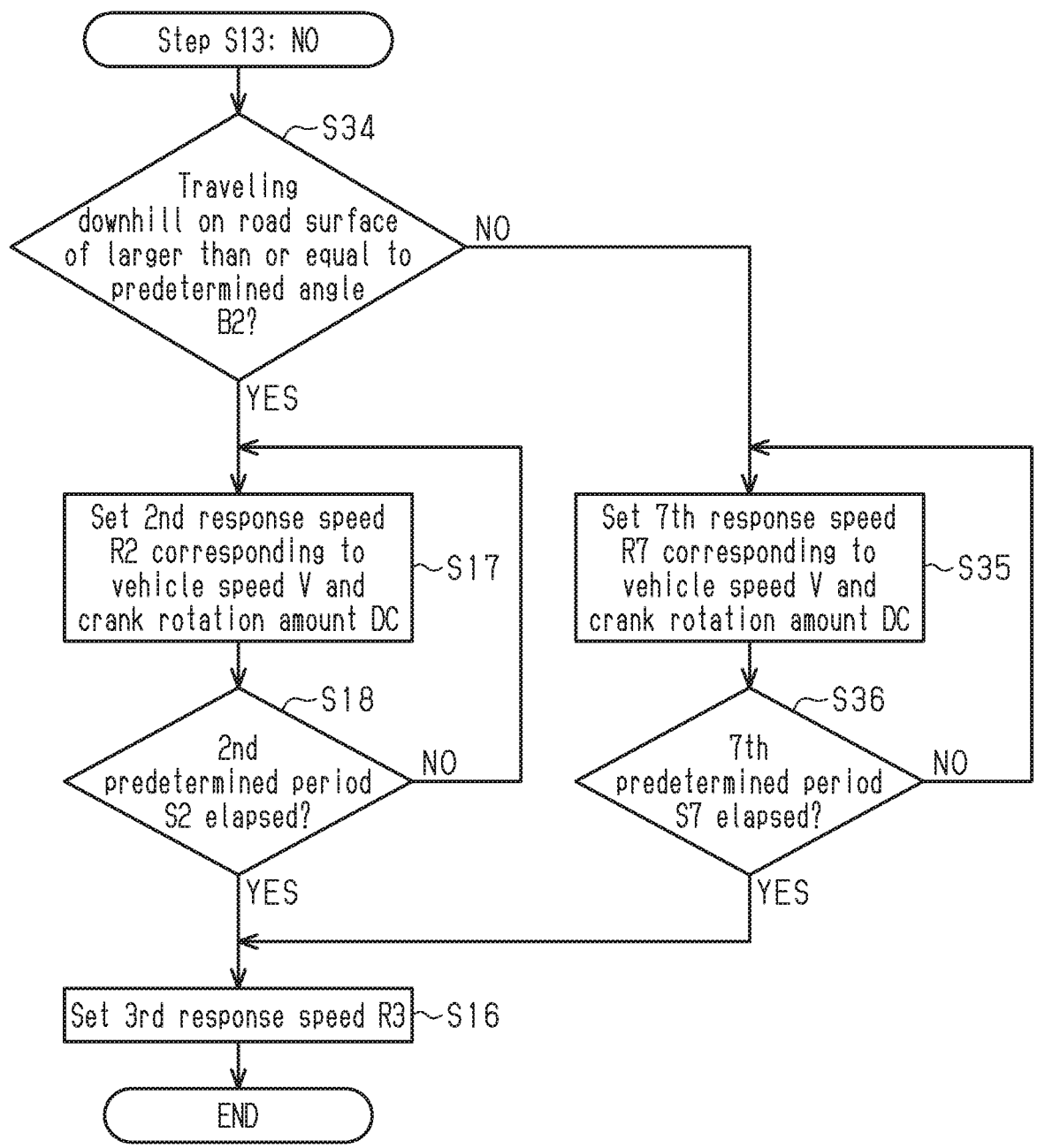
FIG. 11 is a second flowchart of a process of changing the response speed executed by the electronic controller in accordance with the third embodiment.

A control device 50 in accordance with a third embodiment will now be described with reference to FIGS. 10 and 11. Since the control device 50 in accordance with the third embodiment is the same as the control device 50 in accordance with the second embodiment except in a processing of changing a response speed R in a case in which a road surface on which a human-powered vehicle 10 is traveling is a downhill, same reference numerals are given to those components that are the same as the corresponding components of the second embodiment. Such components will not be described in detail.

In the case in which the road surface on which the human-powered vehicle 10 is traveling is a downhill of larger than or equal to a predetermined angle B2, the electronic controller 52 is configured to control a motor 18 so that a first response speed R1 becomes equal to a sixth response speed R6 and controls the motor 18 so that a second response speed R2 becomes equal to a seventh response speed R7. The sixth response speed R6 is slower than the first response speed R1, and the seventh response speed R7 is faster than the second response speed R2. The sixth response speed R6 can be equal to the seventh response speed R7. The sixth response speed R6 and the seventh response speed R7 differ from the third response speed R3. The predetermined angle B2 is represented by an absolute value.

A processing of changing the response speed R will now be described with reference to FIGS. 5, 10, and 11. In the present process, after an affirmative determination in step S13 in FIG. 5, step S31 is performed. After a negative determination in step S13, step S34 is performed.

If the electronic controller 52 determines in step S13 that the control state is a first control state, then the electronic controller 52 proceeds to step S31 and determines whether the human-powered vehicle 10 is traveling on a road surface having a downhill inclination angle that is larger than or equal to the predetermined angle B2. In a case where the electronic controller 52 determines that the human-powered vehicle 10 is traveling on a road surface that does not have a downhill inclination angle that is larger than or equal to the predetermined angle B2, then the electronic controller 52 proceeds to step S14.

If the electronic controller 52 determines in step S31 that the human-powered vehicle 10 is traveling on a road surface having a downhill inclination angle that is larger than or equal to the predetermined angle B2, then the electronic controller 52 proceeds to step S32. In step S32, the electronic controller 52 sets the sixth response speed R6 corresponding to a vehicle speed V and a rotation amount DC of the crank. Then, the electronic controller 52 proceeds to step S33. In step S33, the electronic controller 52 determines whether a sixth predetermined period S6 has elapsed. The electronic controller 52 repeats the processing of steps S32 and S33 until the sixth predetermined period S6 elapses. If the electronic controller 52 determines that the sixth predetermined period S6 has elapsed, the electronic controller 52 proceeds to step S16. In step S16, the electronic controller 52 sets the response speed R to the third response speed R3 and then ends processing.

If the electronic controller 52 determines in step S13 that the control state is not a first control state, the electronic controller 52 proceeds to step S34 and determines whether or not the human-powered vehicle 10 is traveling on the road surface having a downhill inclination angle that is larger than or equal to the predetermined angle B2. If the electronic controller 52 determines that the human-powered vehicle 10 is traveling on a road surface that does not have a downhill inclination angle that is larger than or equal to the predetermined angle B2, then the electronic controller 52 proceeds to step S17.

If the electronic controller 52 determines in step S34 that the human-powered vehicle 10 is traveling on a road surface having a downhill inclination angle that is larger than or equal to the predetermined angle B2, then the electronic controller 52 proceeds to step S35. In step S35, the electronic controller 52 sets the seventh response speed R7 corresponding to the vehicle speed V and the rotation amount DC of the crank. Then, the electronic controller 52 proceeds to step S36. In step S36, the electronic controller 52 determines whether a seventh predetermined period S7 has elapsed. The electronic controller 52 repeats the processing of steps S35 and S36 until the seventh predetermined period S7 elapses. If the electronic controller 52 determines that the seventh predetermined period S7 has elapsed, the electronic controller 52 proceeds to step S16. In step S16, the electronic controller 52 sets the response speed R to the third response speed R3 and then ends processing.

Modifications

The description related with the above embodiments exemplifies, without any intention to limit, an applicable form of a control device for a human-powered vehicle according to the present disclosure. In addition to the embodiments described above, the control device for a human-powered vehicle according to the present disclosure is applicable to, for example, modifications of the above embodiments that are described below and combinations of at least two of the modifications that do not contradict each other. In the modifications hereafter, same reference numerals are given to those components that are the same as the corresponding components of the above embodiments. Such components will not be described in detail.

In the first embodiment, the second response speed R2 can be set to be faster than the first response speed R1. In a case in which the first control state is set, the electronic controller 52 controls the motor 18 so that the response speed R becomes equal to the third response speed R3 if the first predetermined period 51 elapses while the second control state is set, the electronic controller 52 controls the motor 18 so that the response speed R becomes equal to the third response speed R3 in the case in which the second predetermined period S2 elapses. Therefore, during the first predetermined period S1 and the second predetermined period S2, it is possible to suitably control the motor for the traveling condition in both the first control state and the second control state.

In the first embodiment and the modifications thereof, in the case in which the first control state is set, the electronic controller 52 can control the response speed R to be equal to the first response speed R1 even after the first predetermined period S1 elapses.

In the first embodiment and its modifications, in a case in which the second control state is set, the electronic controller 52 can control the response speed R to be equal to the second response speed R2 even after the second predetermined period S2 elapses.

In the first embodiment and its modifications, in a case in which the road surface on which the human-powered vehicle 10 is traveling is an uphill of larger than or equal to the predetermined angle B1, the electronic controller 52 can control the motor 18 so that the first response speed R1 becomes equal to the fourth response speed R4 and control the motor 18 so that the second response speed R2 becomes equal to the fifth response speed R5. In addition, in a case in which the road surface on which the human-powered vehicle 10 is traveling is a downhill of larger than or equal to the predetermined angle B2, the electronic controller 52 can control the motor 18 so that the first response speed R1 becomes equal to the sixth response speed R6 and control the motor 18 so that the second response speed R2 becomes equal to the seventh response speed R7. Specifically, the process of changing the response speed R shown in FIG. 5 of the first embodiment can be modified to add at least one of a process of changing the response speed R shown in FIGS. 8 and 9 of the second embodiment and a process of changing the response speed R shown in FIGS. 10 and 11 of the second embodiment.

In the second embodiment, in a case in which the human-powered vehicle 10 is traveling on a road surface having a downhill inclination angle that is larger than or equal to the predetermined angle B2, the electronic controller 52 can control the motor 18 so that the first response speed R1 becomes equal to the sixth response speed R6 and control the motor 18 so that the second response speed R2 becomes equal to the seventh response speed R7. Specifically, the process of changing the response speed R shown in FIGS. 8 and 9 of the second embodiment can be modified to add the process of changing the response speed R shown in FIGS. 10 and 11 of the second embodiment.

In the second embodiment, the fourth response speed R4 and the fifth response speed R5 can be equal to the third response speed R3, and the electronic controller 52 can control the motor 18 to be equal to the third response speed R3 in a case in which the human-powered vehicle 10 is traveling on a road surface having an uphill inclination angle that is larger than or equal to the predetermined angle B1.

In the third embodiment, the sixth response speed R6 and the seventh response speed R7 can be equal to the third response speed R3, and the electronic controller 52 can control the motor 18 to be equal to the third response speed R3 in a case in which the human-powered vehicle 10 is traveling on a road surface having a downhill inclination angle that is larger than or equal to the predetermined angle B1.

In each of the embodiments and their modifications, the traveling condition of the human-powered vehicle 10 can include at least one of the rotational speed of the crank of the human-powered vehicle 10, the rotation amount of the wheel of the human-powered vehicle 10, and the traveling distance of the human-powered vehicle 10, instead of or in addition to the rotation amount of the crank of the human-powered vehicle 10. In a case in which the traveling condition of the human-powered vehicle 10 includes the rotational speed of the crank of the human-powered vehicle 10, the first predetermined state includes a state where the rotational speed of the crank of the human-powered vehicle 10 is equal to the first speed, and the second predetermined state includes a state where the rotational speed of the crank of the human-powered vehicle 10 is equal to the second speed. In a case in which the traveling condition of the human-powered vehicle 10 includes the rotation amount of the wheel of the human-powered vehicle 10, the first predetermined state includes a state where the rotation amount of the wheel is equal to a first rotation amount, and the second predetermined state includes a state where the rotation amount of the wheel is equal to a second rotation amount. In a case in which the traveling condition of the human-powered vehicle 10 includes the traveling distance of the human-powered vehicle 10, the first predetermined state includes a state where the traveling distance of the human-powered vehicle 10 is equal to a first distance, and the second predetermined state includes a state where the traveling distance of the human-powered vehicle 10 is equal to a second distance.

In each of the embodiments and their modifications, the first predetermined period S1 can include a period from when the crank of the human-powered vehicle 10 starts to rotate to when the traveling condition of the human-powered vehicle 10 reaches the first predetermined state. For example, in step S15 in FIG. 5, the electronic controller 52 executes the processing of steps S14 and S15 from when it is determined that the crank has started to rotate in step S11 to when the rotation amount of the crank becomes equal to the first rotation amount DC1, and if the rotation amount of the crank becomes equal to the first rotation amount DC1, the electronic controller 52 proceeds to step S16. In this modification, the electronic controller 52 can start to drive the motor 18 when the crank starts to rotate.

In each of the embodiments and its modifications, the second predetermined period S2 can include a period from when the crank of the human-powered vehicle 10 starts to rotate to when the traveling condition of the human-powered vehicle 10 reaches the second predetermined state. For example, in step S17 of FIG. 5, the electronic controller 52 executes the processing of steps S16 and S17 from when determining that the crank has started to rotate in step S11 to when the rotation amount of the crank becomes equal to the second rotation amount DC2, and if the rotation amount of the crank becomes equal to the second rotation amount DC2, the electronic controller 52 proceeds to step S16. In this modification, the electronic controller 52 can start to drive the motor 18 when the crank starts to rotate.

In each of the embodiments and its modifications, the first predetermined period S1 can include a period from when driving of the motor 18 starts to when the first period, which is determined in advance, elapses. For example, in the case in which the first predetermined period S1 is set to be a first period, in step S15 in FIG. 5, the electronic controller 52 executes steps S14 and S15 from when driving of the motor 18 is started to when the first period, which is determined in advance, elapses. If the first period determined in advance has elapsed, the electronic controller 52 proceeds to step S16.

In each of the embodiments and modifications thereof, the second predetermined period S2 can include a period from a time at which the motor 18 starts to be driven to a time at which the second period determined in advance elapses. For example, in the case in which the second predetermined period S2 is set to be a second period, in the processing of step S17 in FIG. 5, the electronic controller 52 executes the processing of steps S17 and S18 from a time at which the motor 18 starts to be driven to a time at which the second period determined in advance elapses, and if the second period determined in advance elapses, the electronic controller 52 proceeds to step S16.

In each of the embodiments and its modifications, the first predetermined period S1 can include a period from when driving of the motor 18 starts after the rotation of the crank of the human-powered vehicle 10 has started to when the third period, which has been determined in advance, elapses. For example, in a case in which the first predetermined period S1 is set to a third period, in step S15 of FIG. 5, the electronic controller 52 executes steps S14 and S15 from when determining that the crank has started to rotate in step S11 to when the third period determined in advance has elapsed. If the third period has elapsed, the electronic controller 52 proceeds to step S16. In this modification, the electronic controller 52 can start driving the motor 18 as the crank starts to rotate.

In each of the embodiments and its modifications, the second predetermined period S2 can include a period from when driving of the motor 18 starts after the crank of the human-powered vehicle 10 starts to rotate to when a fourth period, which is determined in advance, elapses. For example, in a case in which the second predetermined period S2 is set to the fourth period, in step S17 of FIG. 5, the electronic controller 52 executes steps S17 and S18 from when determining that the crank has started to rotate in step S11 to when the fourth period determined in advance elapses. If the fourth period determined in advance elapses, the electronic controller 52 proceeds to step S16. In this modification, the electronic controller 52 can start to drive the motor 18 when the crank starts to rotate.

In each of the embodiments and its modifications, the first response speed R1 can be the same as the third response speed R3. In this case, in the first control state where the ratio A is lower than the second control state, the output of the motor 18 can be increased early in a case in which the human drive force TA is increased.

In each of the embodiments and its modifications, at least one of the first response speed R1 and the second response speed R2 can be set to be faster than or equal to the third response speed R3. In this case, at least one of the first response speed R1 and the second response speed R2 can be set to be faster than or equal to third response speed R3 by setting the gain G to 100% or greater.

What is claimed is:

1. A human-powered vehicle control device comprising:
an electronic controller that controls a motor used to assist in propulsion of a human-powered vehicle,
the electronic controller being configured to be selectively settable to a first control state that controls the motor in accordance with human drive force and a second control state that controls the motor in accordance with human drive force so that a ratio of an output of the motor to the human drive force is greater than that of the first control state,
the electronic controller being configured to control the motor so that a response speed of the motor with respect to a change in the human drive force during a first predetermined period becomes equal to a first response speed while the electronic controller is set to the first control state, and
the electronic controller being configured to control the motor so that the response speed during a second predetermined period including the first predetermined period becomes equal to a second response speed that is slower than the first response speed while the electronic controller is set to the second control state.

2. The human-powered vehicle control device according to claim 1, wherein
the first predetermined period includes a period from a time at which the motor starts to be driven to a time at which a first period that is determined in advance elapses, and
the second predetermined period includes a period from a time at which the motor starts to be driven to a time at which a second period that is determined in advance elapses.

3. The human-powered vehicle control device according to claim 1, wherein the first predetermined period includes a period from a time at which the motor starts to be driven to a time at which a traveling condition of the human-powered vehicle shifts to a first predetermined state, and
the second predetermined period includes a period from a time at which the motor starts to be driven to a time at which the traveling condition of the human-powered vehicle shifts to a second predetermined state.

4. The human-powered vehicle control device according to claim 2, wherein
the electronic controller is configured to start driving the motor upon determining the human drive force has become greater than or equal to a predetermined value.

5. The human-powered vehicle control device according to claim 1, wherein
the first predetermined period includes a period from a time at which the motor starts to be driven after rotation of a crank of the human-powered vehicle starts to a time at which a third period that is determined in advance elapses, and
the second predetermined period includes a period from a time at which the motor starts to be driven after rotation of the crank of the human-powered vehicle starts to a time at which a fourth period that is determined in advance elapses.

6. The human-powered vehicle control device according to claim 1, wherein
the first predetermined period includes a period from a time at which rotation of a crank of the human-powered vehicle starts to a time at which a traveling condition of the human-powered vehicle shifts to a first predetermined state, and
the second predetermined period includes a period from a time at which rotation of a crank of the human-powered vehicle starts to a time at which a traveling condition of the human-powered vehicle shifts to a second predetermined state.

7. The human-powered vehicle control device according to claim 3, wherein
the traveling condition of the human-powered vehicle includes at least one of a rotation amount of a crank of the human-powered vehicle, a rotational speed of the crank of the human-powered vehicle, a rotation amount of a wheel of the human-powered vehicle, and traveled distance of the human-powered vehicle.

8. The human-powered vehicle control device according to claim 3, wherein
the first predetermined state and the second predetermined state differ from each other.

9. The human-powered vehicle control device according to claim 1, wherein
the electronic controller is configured to control the motor so that the response speed becomes equal to a third response speed upon determining the first predetermined period has elapsed while the electronic controller is set to the first control state, and
the electronic controller is configured to control the motor so that the response speed becomes equal to the third response speed upon determining the second predetermined period has elapsed while the electronic controller is set to the second control state.

10. The human-powered vehicle control device according to claim 9, wherein
the electronic controller is configured to control the motor so that the first response speed approaches the third response speed as time elapses during the first predetermined period while the electronic controller is set to the first control state;
the electronic controller is configured to control the motor so that the second response speed approaches the third response speed as time elapses during the second predetermined period while the electronic controller is set to the second control state.

11. The human-powered vehicle control device according to claim 1, wherein
the electronic controller is configured to increase the first response speed for a case where a vehicle speed of the human-powered vehicle is greater than or equal to a first vehicle speed from the first response speed for a case in which the vehicle speed of the human-powered vehicle is less than the first vehicle speed while the electronic controller is set to the first control state.

12. The human-powered vehicle control device according to claim 1, wherein
the electronic controller is configured to increase the second response speed from the second response speed for a state in which the vehicle speed of the human-powered vehicle in the second predetermined period is less than a second vehicle speed occurring while the motor is not being driven upon determining a state exists in which the vehicle speed of the human-powered vehicle in the second predetermined period is greater than or equal to a second vehicle speed while the motor is not being driven.

13. The human-powered vehicle control device according to claim 1, wherein
the electronic controller is configured to control the motor so that the first response speed becomes equal to a fourth response speed and control the motor so that the second response speed becomes equal to a fifth response speed upon determining the human-powered vehicle is traveling on a road surface having an uphill inclination angle that is larger than or equal to a predetermined angle; and the fourth response speed is faster than the first response speed; and the fifth response speed is faster than the second response speed.

14. The human-powered vehicle control device according to claim 1, wherein the electronic controller is configured to control the motor so that the first response speed becomes equal to a sixth response speed and controls the motor so that the second response speed becomes equal to a seventh response speed upon determining the human-powered vehicle is traveling on a road surface having a downhill inclination angle that is larger than or equal to a predetermined angle; and the sixth response speed is slower than the first response speed; and the seventh response speed is slower than the second response speed.

15. The human-powered vehicle control device according to claim 1, wherein the electronic controller further includes a filter that changes a response speed of the motor.

16. The human-powered vehicle control device according to claim 15, wherein the electronic controller is configured to change a gain of the filter to change the response speed.

17. A human-powered vehicle control device comprising:

an electronic controller that controls a motor used to assist in propulsion of a human-powered vehicle, the electronic controller being configured to be selectively settable to a first control state that controls the motor in accordance with human drive force and a second control state that controls the motor in accordance with the human drive force so that a ratio of an output of the motor to the human drive force is greater than that of the first control state, the electronic controller is configured to control the motor so that a response speed of the motor with respect to a change in the human drive force during a first predetermined period becomes equal to a first response speed and controls the motor so that the response speed becomes equal to a third response speed in a case where the first predetermined period elapses while the electronic controller is set to the first control state, and the electronic controller is configured to control the motor so that the response speed during a second predetermined period including the first predetermined period becomes equal to a second response speed that differs from the first response speed and controls the motor so that the response speed becomes equal to the third response speed in a case where the second predetermined period elapses while the electronic controller is set to the second control state.

18. The human-powered vehicle control device according to claim 17, wherein the third response speed differs from the first response speed and the second response speed.

19. The human-powered vehicle control device according to claim 17, wherein the third response speed is higher than the first response speed and the second response speed.

* * * * *